(12) United States Patent
Jang et al.

(10) Patent No.: US 11,778,307 B2
(45) Date of Patent: Oct. 3, 2023

(54) ELECTRONIC DEVICE FOR PROVIDING CAMERA PREVIEW AND METHOD THEREFOR

(71) Applicant: Samsung Electronics Co., Ltd., Gyeonggi-do (KR)

(72) Inventors: Jongwoon Jang, Gyeonggi-do (KR); Deukkyu Oh, Gyeonggi-do (KR); Kwangtaek Woo, Gyeonggi-do (KR); Gisoo Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/836,081

(22) Filed: Jun. 9, 2022

(65) Prior Publication Data

US 2022/0303476 A1    Sep. 22, 2022

Related U.S. Application Data

(63) Continuation of application No. PCT/KR2020/018822, filed on Dec. 21, 2020.

(30) Foreign Application Priority Data

Jan. 8, 2020    (KR) .................. 10-2020-0002456

(51) Int. Cl.
*H04N 23/63*    (2023.01)
*H04N 5/262*    (2006.01)
(Continued)

(52) U.S. Cl.
CPC ......... *H04N 23/632* (2023.01); *H04N 5/2628* (2013.01); *H04N 23/51* (2023.01); *H04N 23/62* (2023.01)

(58) Field of Classification Search
CPC ............. H04M 1/0214; H04M 1/0235; H04M 1/0245; H04M 2250/16; H04M 2250/52;
(Continued)

(56) References Cited

U.S. PATENT DOCUMENTS 7,002,616 B2    2/2006   Taneya et al.
9,013,458 B2    4/2015   Cho et al.
(Continued)

FOREIGN PATENT DOCUMENTS

KR    10-2014-0044665 A    4/2014
KR    10-2014-0115913 A    10/2014
(Continued)

OTHER PUBLICATIONS

European Search Report dated Dec. 16, 2022.

*Primary Examiner* — Amy R Hsu
(74) *Attorney, Agent, or Firm* — Cha & Reiter, LLC

(57) ABSTRACT

A foldable electronic device may include: a foldable housing foldable along at least one axis; a first display disposed on a first surface of the foldable housing; a second display disposed on a second surface of the foldable housing; a first camera; a second camera; at least one sensor; a memory; and a processor. The processor may be configured to: provide a first preview to the first display by using the first camera in a folded state; receive a region configuration input for the first preview through the first display; after the reception of the region configuration input, sense unfolding of the foldable electronic device by using the at least one sensor; and provide a second preview corresponding to the region configuration input through the second display by using the second camera in an unfolded state. In addition, various other embodiments can be understood through the specification.

20 Claims, 16 Drawing Sheets

(51) Int. Cl.
*H04N 23/51* (2023.01)
*H04N 23/62* (2023.01)

(58) Field of Classification Search
CPC ...... H04N 23/51; H04N 23/531; H04N 23/57; H04N 23/62; H04N 23/632; H04N 5/2628
See application file for complete search history.

(56) References Cited

U.S. PATENT DOCUMENTS

| | | | |
|---|---|---|---|
| 9,386,300 B2 | 7/2016 | Lee et al. | |
| 9,992,418 B2 | 6/2018 | Kim et al. | |
| 10,506,153 B2 | 12/2019 | Kang et al. | |
| 2008/0297626 A1* | 12/2008 | Hashimoto | H04N 1/195 348/240.99 |
| 2013/0321340 A1* | 12/2013 | Seo | G06F 1/1647 345/174 |
| 2014/0285476 A1 | 9/2014 | Cho et al. | |
| 2015/0015762 A1 | 1/2015 | Kim et al. | |
| 2015/0022436 A1* | 1/2015 | Cho | G06F 1/1615 345/156 |
| 2016/0050408 A1* | 2/2016 | Lee | H04N 23/90 348/47 |
| 2017/0094168 A1 | 3/2017 | Kang et al. | |
| 2018/0270420 A1 | 9/2018 | Lee et al. | |
| 2019/0045135 A1 | 2/2019 | Ryu et al. | |
| 2020/0128116 A1* | 4/2020 | Jang | H04M 1/72469 |

FOREIGN PATENT DOCUMENTS

| | | |
|---|---|---|
| KR | 10-2015-0007875 A | 1/2015 |
| KR | 10-2016-0021497 A | 2/2016 |
| KR | 10-2016-0087682 A | 7/2016 |
| KR | 10-2017-0038365 A | 4/2017 |
| KR | 10-2018-0106076 A | 10/2018 |

* cited by examiner

ELECTRONIC DEVICE FOR PROVIDING CAMERA PREVIEW AND METHOD THEREFOR

CROSS-REFERENCE TO RELATED APPLICATION(S)

This application is a Continuation of and claims priority under 35 U.S.C. § 120 to PCT International Application No. PCT/KR2020/018822, which was filed on Dec. 21, 2020, and claims priority to Korean Patent Application No. 10-2020-0002456, filed on Jan. 8, 2020, in the Korean Intellectual Property Office, the disclosure of which are incorporated by reference herein their entirety.

BACKGROUND

Technical Field

One or more embodiments of the instant disclosure generally relate to the use of a camera of a foldable electronic device, and more particularly, relates to a method of controlling camera of a foldable electronic device used for photography, the angle of view of images, and/or the ratio of an object to the entire area of a preview image that depends on folding/unfolding operation of the foldable electronic device in a specific situation, and an electronic device.

Description of Related Art

Mobile terminals of various shapes have been commercialized. The mobile terminals may each include a housing and/or a display that can be folded or rolled. The form factor of the mobile terminals may be changed due to the folding or rolling operation. The mobile terminals may include a plurality of cameras and/or displays.

For example, in the case of a foldable electronic device (e.g., device that can be in-folded), a first display, while unfolded, may be folded about a connecting part of the display so that the user would no longer be able to use or see the first display. In this case, the electronic device may allow the user to continually use the electronic device in the folded state through a second display located on the opposite side to the first display. To provide smooth operation of the electronic device, the displays of the electronic device used by the user may be switched depending on the folding/unfolding operation.

In another example, a first camera located on one surface including the connecting part may come into contact with another surface folded about the connecting part when the electronic device is folded. In this case, the user using the first camera may no longer be able to use the first camera in the folded state. The electronic device may switch the first camera to a second camera located on the opposite side to the first camera along with the folding operation and may allow the user to continually use the camera function in the folded state.

SUMMARY

Conventionally, the electronic device may provide a camera preview or preview image through a display using a camera before an image is captured. In the case of a foldable electronic device, the camera preview may be provided in both the folded state and the unfolded state. The foldable electronic device may switch the display and the camera when the form factor of the electronic device is changed due to the folding operation or the unfolding operation. The foldable electronic device may continually provide the camera preview even after the switching of the display and the camera.

Furthermore, the user may manipulate the camera preview image through the display. For example, the user may zoom in on a specific area of the preview by performing a zoom-in input on the preview.

However, when the display and/or the camera is switched due to the change in the shape of the foldable electronic device as described above, the user's manipulation of the preview image may not be maintained. For example, even though the user performs a zoom-in input on the preview provided in the folded state, a non-zoomed-in preview or a preview in which an area other than the area specified by the user is zoomed in may be provided while the foldable electronic device is changed to the unfolded state by an unfolding operation.

Then to obtain the image intended by the user in the folded state, the user has to re-perform the zoom-in input on the preview provided in the unfolded state. This may be inconvenient for the user.

A foldable electronic device according to an embodiment of the disclosure includes a foldable housing that is foldable along at least one axis, a first display disposed on a first surface of the foldable housing, a second display disposed on a second surface of the foldable housing, a first camera, a second camera, at least one sensor, memory, and a processor connected to the first display, the second display, the first camera, the second camera, the memory, and the at least one sensor. The processor is configured to provide, in a folded state, a first preview on the first display using the first camera, receive an area setting input for the first preview through the first display, detect unfolding of the foldable electronic device using the at least one sensor after receiving the area setting input, and provide, in an unfolded state, a second preview corresponding to the area setting input, through the second display using the second camera.

A method for operating a foldable electronic device according to an embodiment of the disclosure includes providing, in a folded state, a first preview on a first display using a first camera, receiving an area setting input for the first preview through the first display, detecting unfolding of the foldable electronic device using at least one sensor after receiving the area setting input, and providing, in an unfolded state, a second preview corresponding to the area setting input, through a second display using a second camera.

In a computer readable recording medium that stores one or more instructions executable by at least one processor according to an embodiment of the disclosure, the one or more instructions, when executed, cause the at least one processor to provide, in a folded state, a first preview on a first display using a first camera, to receive an area setting input for the first preview through the first display, to detect unfolding of a foldable electronic device using at least one sensor after receiving the area setting input, and to provide, in an unfolded state, a second preview corresponding to the area setting input, through a second display using a second camera.

Additional aspects will be set forth in part in the description which follows and, in part, will be apparent from the description, or may be learned by practice of the presented embodiments

BRIEF DESCRIPTION OF DRAWINGS

The above and other aspects, features, and advantages of certain embodiments of the present disclosure will be more apparent from the following description taken in conjunction with the accompanying drawings, in which.

With regard to description of the drawings, identical or similar reference numerals may be used to refer to identical or similar components.

DETAILED DESCRIPTION

According to certain embodiments of the disclosure, a user may be provided with a user-desired area of an image on a more detailed and larger screen by unfolding the foldable electronic device during operation of the cameras of the foldable electronic device. In addition, even after the unfolding, the user may be provided with continuous operation and an image that corresponds to the image editing and effect that occurred during the folded state. The foldable electronic device may provide smooth usability by providing the continuous operation.

According to certain embodiments of the disclosure, the foldable electronic device may correct minute shake of the terminal that occurs during unfolding. As the foldable electronic device corrects the shake during the unfolding, the preview in an unfolded state may have the same angle of view as the preview in a folded state. The foldable electronic device may provide stability of use by providing the previews having the same angle of view before and after the unfolding.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
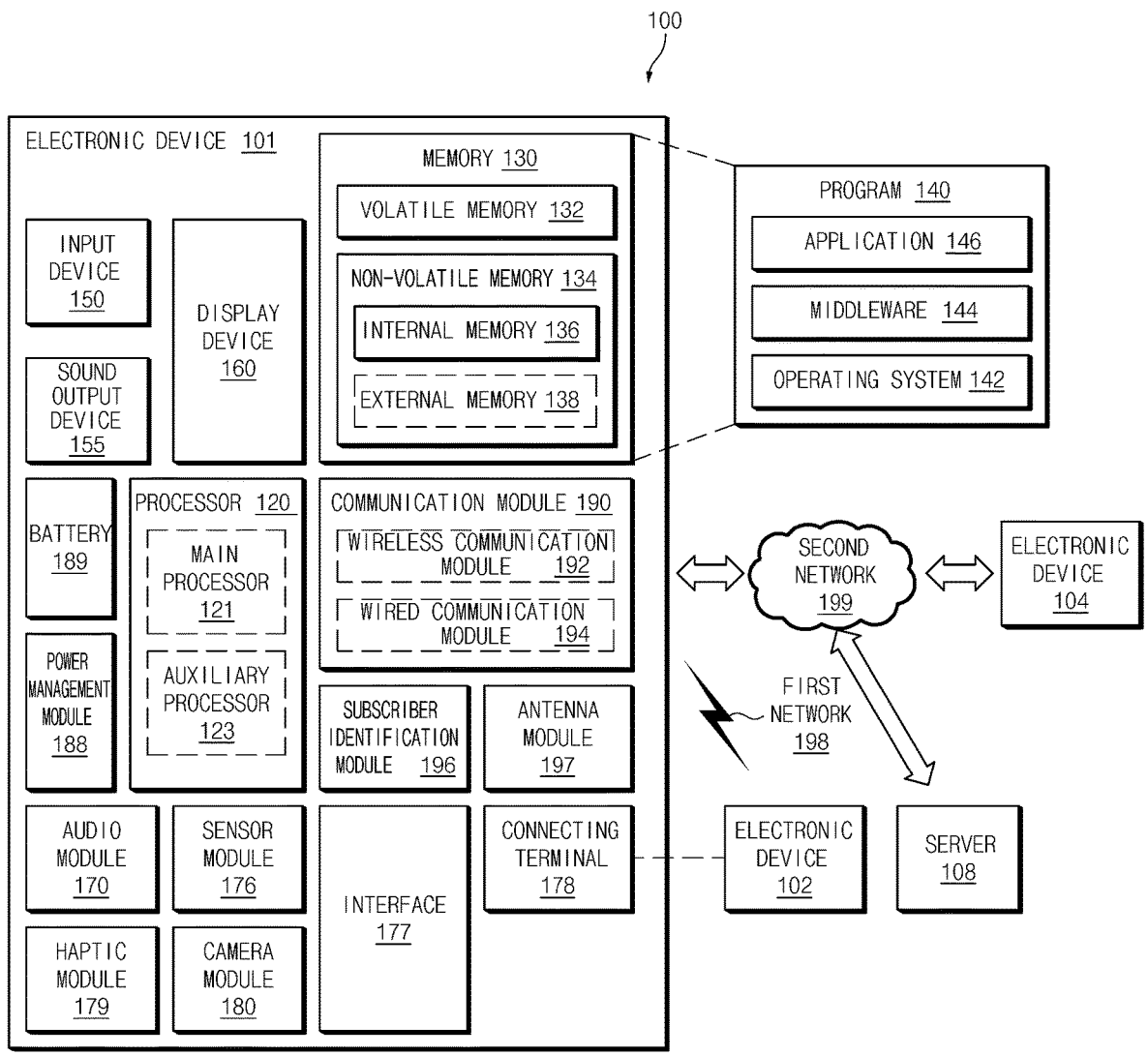
FIG. 1 illustrates an electronic device in a network environment according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
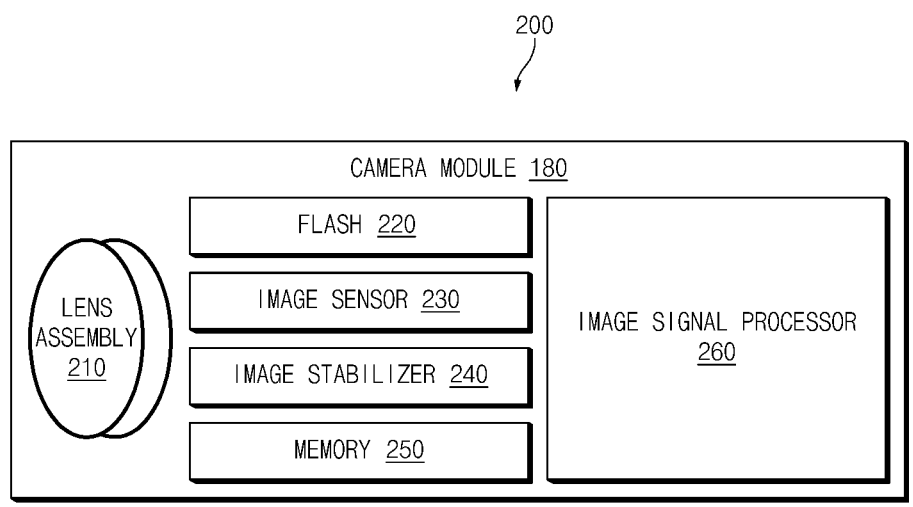
FIG. 2 is a block diagram illustrating a camera module according to an embodiment.

FIG. 2 is a block diagram 200 illustrating the camera module 180 according to an embodiment.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
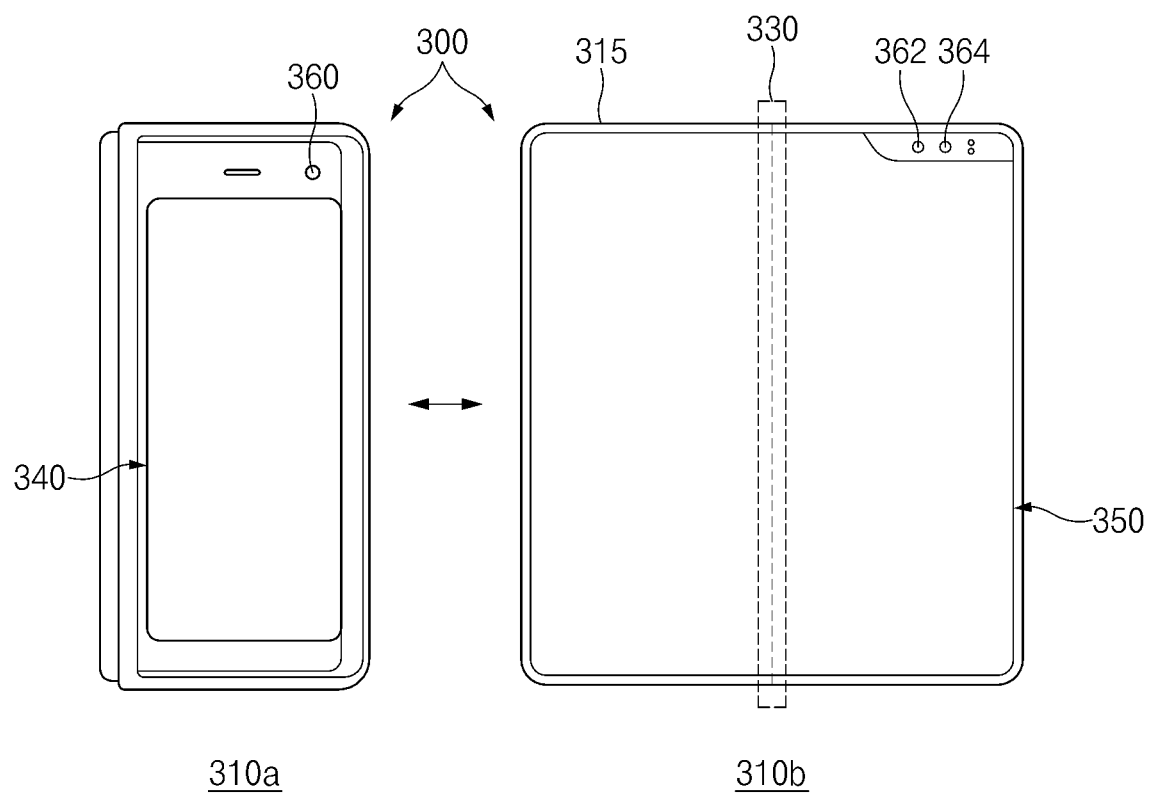
FIG. 3 illustrates a change of state depending on folding/unfolding of a foldable electronic device according to an embodiment.

FIG. 3 illustrates a change of state depending on folding/unfolding of a foldable electronic device according to an embodiment.

According to an embodiment, the foldable electronic device 300 (e.g., the electronic device 101 of FIG. 1) may include a foldable housing 315, a first display 340, a second display 350, a first camera 360, a second camera 362, a third camera 364, and/or a hinge 330. Embodiments are not limited by this disclosure. For example, the foldable electronic device 300 may further include components not illustrated in FIG. 3, or may not include at least some of the components illustrated in FIG. 3. For example, the foldable electronic device 300 may further include a processor, memory, and/or a sensor module. For example, the number of cameras of the foldable electronic device 300 is illustrative, and more or fewer cameras may be included in the foldable electronic device 300.

The foldable electronic device 300 may be used in a folded state 310a or an unfolded state 310b by being folded/unfolded. The folded state 310a or the unfolded state 310b of the foldable electronic device illustrated in FIG. 3 is illustrative and is not limited by the embodiment of the disclosure. For example, the foldable device 300 may be a rollable device and may be used in a rolled state and an unrolled state. Specific embodiments may be illustrated by FIGS. 4 and 5.

According to an embodiment, a first surface may be referred to as a display surface on which the first display 340 is located in the folded state 310a. A second surface may be referred to as a display surface on which the second display 350 is located in the unfolded state 310b. In the unfolded state 310b, the first surface and the second surface may be located on the opposite sides.

According to an embodiment, the foldable electronic device 300 may be foldable depending on change of the folded/unfolded state of the hinge 330, and the second display 350 may be a flexible display. The form of the foldable electronic device 300 is illustrative, and embodiments are not limited by this disclosure. Hereinafter, other forms of electronic devices will be described with reference to FIGS. 4 and 5.

Figure 4:
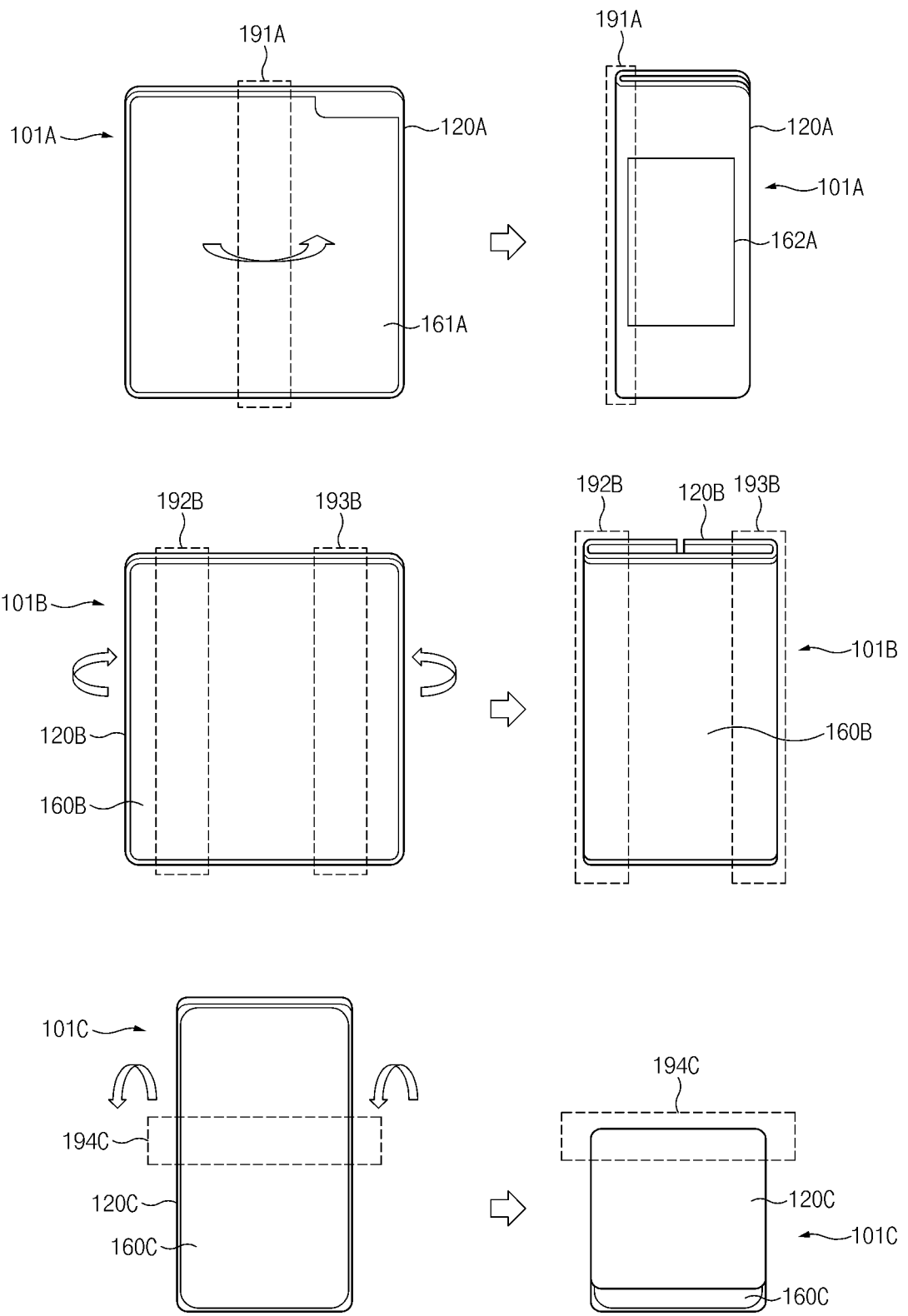
FIG. 4 illustrates foldable electronic devices according to certain embodiments.

FIG. 4 illustrates foldable electronic devices according to certain embodiments.

According to certain embodiments, the shape of an electronic device (e.g., the electronic device 101 of FIG. 1) may be physically changed depending on folding/unfolding. For example, the electronic device 101 may include, in at least a portion thereof, a housing and a display that are flexible. The electronic device may be folded (e.g., closed) or unfolded (e.g., opened) about the flexible portion of the electronic device. For example, the flexible portion of the electronic device may be referred to as the folding portion, which in turn refers to a portion (e.g., hinge) or an area in which the shape of the electronic device can be changed and is not limited to a specific shape.

According to an embodiment, a first electronic device 101A (e.g., the electronic device 101 of FIG. 1) may be folded leftward and rightward. For example, the first electronic device 101A may be folded about at least one folding portion 191A. For example, the first electronic device 101A may include, in a portion corresponding to the folding portion 191A, a first display 161A (e.g., the display device 160 of FIG. 1) and a housing 120A that are flexible. The first electronic device 101A may be folded leftward and rightward about the folding portion 191A. The first electronic device 101A may include a second display 162A (e.g., the display device 160 of FIG. 1) exposed to the outside in the folded state. In FIG. 4, the first electronic device 101A is referred to as an in-folding electronic device because the first display 161A is folded inward. However, embodiments of the disclosure are not limited thereto. For example, the first electronic device 101A may be an out-folding electronic device, or may be an electronic device that supports both in-folding and out-folding. In another example, although the first display 161A is illustrated as one display, embodiments of the disclosure are not limited thereto. The first electronic device 101A may include a plurality of displays divided with respect to the folding portion 191A. The housing 120A may also include a plurality of housings divided with respect to the folding portion 191A. In another example, the first electronic device 101A may be a combination of a plurality of electronic devices combined so as to be folded about the folding portion 191A. In this case, the plurality of electronic devices may be combined together by a separate structure (e.g., housing or hinge).

According to an embodiment, a second electronic device 101B (e.g., the electronic device 101 of FIG. 1) may be folded leftward and rightward about a plurality of axes. For example, the second electronic device 101B may include, in portions corresponding to at least a second folding portion 192B and a third folding portion 193B, a display 160B (e.g., the display device 160 of FIG. 1) and a housing 120B that are flexible. The second electronic device 101B may be folded leftward and rightward about the second folding portion 192B and the third folding portion 193B. In FIG. 4, the second electronic device 101B is referred to as an out-folding electronic device in which the display 160B is folded outward. However, embodiments of the disclosure are not limited thereto. For example, the second electronic device 101B may be in-folded about the second folding portion 192B and/or the third folding portion 193B. In another example, although the display 160B is illustrated as one display, embodiments of the disclosure are not limited thereto. The second electronic device 101B may include a plurality of displays divided along at least one of the first folding portion 192B or the second folding portion 193B. The housing 120B may also include a plurality of housings divided along at least one of the first folding portion 192B or the second folding portion 193B. In another example, the second electronic device 101B may be a combination of a plurality of electronic devices combined so as to be folded about the first folding portion 191B and the second folding portion 193B. In this case, for example, the plurality of electronic devices may be combined together by a separate structure (e.g., housing or hinge).

According to an embodiment, a third electronic device 101C (e.g., the electronic device 101 of FIG. 1) may be folded upward and downward. For example, the third electronic device 101C may include, in a portion corresponding to at least a fourth folding portion 194C, a display 160C (e.g., the display device 160 of FIG. 1) and a housing 120C that are flexible. The third electronic device 101B may be folded upward and downward about the fourth folding portion 194C. In FIG. 4, the third electronic device 101C is referred to as an in-folding electronic device because the display 160B is folded inward. However, embodiments of the disclosure are not limited thereto. For example, the third electronic device 101C may be out-folded, or in-folded and out-folded, about the third folding portion 193C. In another example, although the display 160C is illustrated as one display, embodiments of the disclosure are not limited thereto. The third electronic device 101C may include a plurality of displays divided along the fourth folding portion 194C. The housing 120C may also include a plurality of housings divided along the folding portion 194C. In another example, the third electronic device 101C may be a combination of a plurality of electronic devices combined so as to be folded about the folding portion 194C. In this case, the plurality of electronic devices may be combined together by a separate structure (e.g., housing or hinge).

The changes in the physical shapes of the electronic devices (e.g., 101A, 101B, and 101C) illustrated in FIG. 4 are illustrative, and embodiments of the disclosure are not limited thereto. For example, the electronic devices may be folded or unfolded about any axis.

Figure 5:
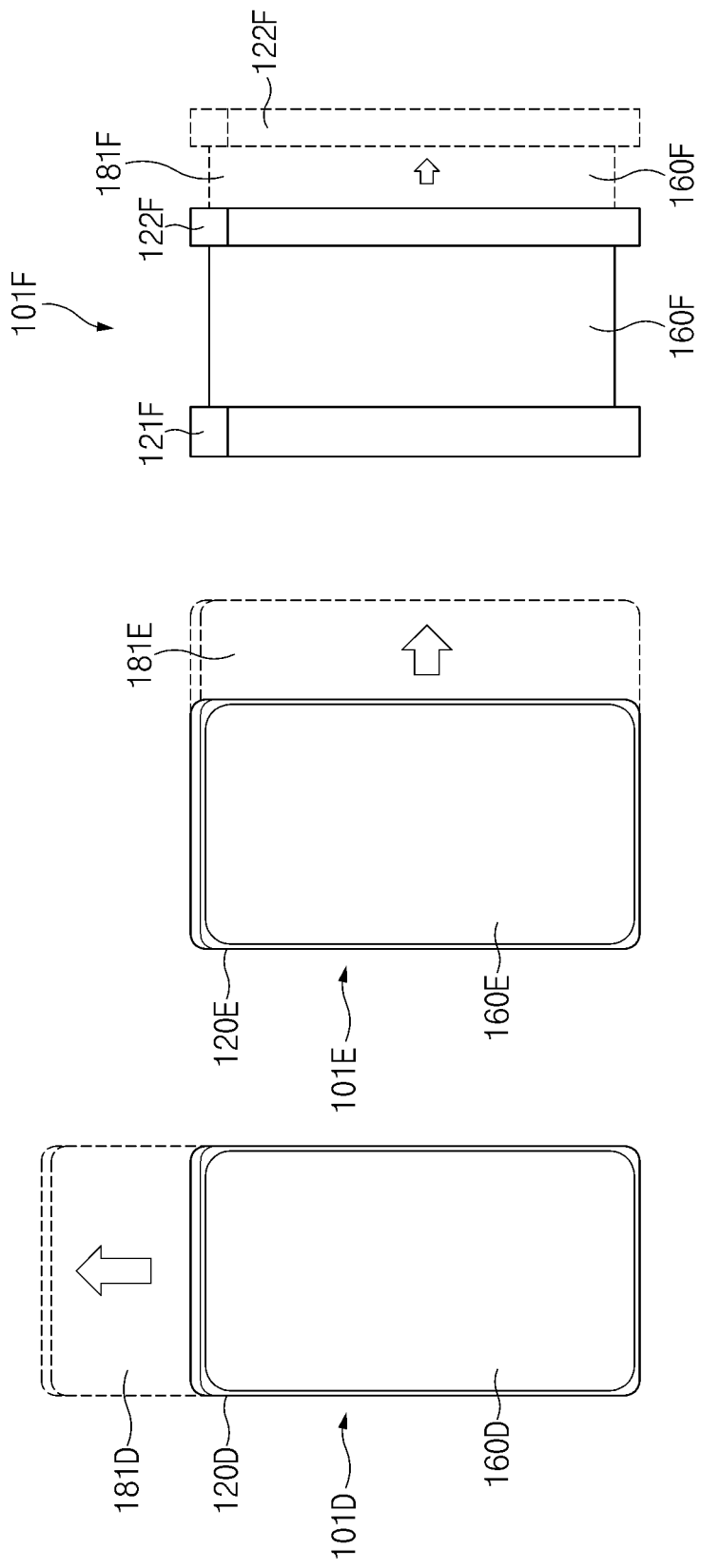
FIG. 5 illustrates extendable electronic devices according to certain embodiments.

FIG. 5 illustrates extendable electronic devices according to certain embodiments.

According to certain embodiments, the shape of an electronic device may be physically changed by extending/ retracting of the housing of the electronic device. For example, the electronic device may include a housing and/or a display, at least a portion of which can be extended. For example, a portion of the electronic device may be slid or rolled such that the electronic device is extended (e.g., opened) or retracted (e.g., closed). Hereinafter, "extension" refers to a portion or an area of the device that corresponds to the difference between a first shape and a second shape when the shape of the electronic device is changed from the first shape to the second shape, and thus the extension is not limited to a specific shape.

According to an embodiment, a fourth electronic device 101D (e.g., the electronic device 101 of FIG. 1) may include an extension 181D that is extended/retracted upward and downward. For example, at least a portion of a housing 120D of the fourth electronic device 101D may include the extension 181D that is extended upward from the fourth electronic device 101D. For example, the extension 181D, which is one portion of the housing 120D, may move upward relative to another portion of the housing 120D to extend the housing 120D of the fourth electronic device 101D. The extension 181D may move independently of a display 160D (e.g., the display device 160 of FIG. 1). For example, the extension 181D may be extended upward relative to the display 160D. In another example, the extension 181D may be extended downward relative to the display 160D. According to an embodiment, the extension 181D may include a camera module. For example, the camera module may be configured to rotate as the extension 181D moves.

According to an embodiment, a fifth electronic device 101E (e.g., the electronic device 101 of FIG. 1) may include an extension 181E that is extended/retracted leftward and rightward. For example, at least a portion of a housing 120E of the fifth electronic device 101E may include the extension 181E that is extended rightward from the fifth electronic device 101E. For example, the extension 181E may move independently of a display 160E (e.g., the display device 160 of FIG. 1). In this case, a portion of the housing 120E may be extended to one side relative to the display 160E, and the extension 181E may be formed accordingly. In another example, the extension 181E may move together with the display 160E. In this case, a portion of the housing 120E and the display 160E may be relatively extended to one side, and the extension 181E may be formed accordingly. According to an embodiment, the extension 181E may include a camera module. For example, the camera module may be configured to rotate as the extension 181E moves.

According to an embodiment, a sixth electronic device 101F (e.g., the electronic device 101 of FIG. 1) may include an extension 181F that is extended/retracted leftward and rightward. For example, a display 160F of the sixth electronic device 101F (e.g., the display device 160 of FIG. 1) may be a rollable display. For example, the display 160F may be rolled and accommodated in a first housing 121F. For example, the display 160F may be unrolled and may be extended between the first housing 121F and a second housing 122F. The extension 181F may be generated as the display 160F is unrolled.

The changes in the physical shapes of the electronic devices (e.g., 101D, 101E, and 101F) illustrated in FIG. 5 are illustrative, and embodiments of the disclosure are not limited thereto. For example, the electronic devices may be extended or retracted in any direction.

Various shape changes have been described in relation to the first electronic device 101A, the second electronic device 101B, the third electronic device 101C, the fourth electronic device 101D, the fifth electronic device 101E, or the sixth electronic device 101F of FIGS. 4 and 5. However, the shape changes are illustrative, and embodiments of the disclosure are not limited thereto.

Referring again to FIG. 3, according to an embodiment, the foldable electronic device 300 may provide a preview on a display using a camera. In the folded state 310a, the foldable electronic device 300 may provide a first preview on the first display 340 using at least one of a plurality of cameras. For example, at least one of the plurality of cameras may be the first camera 360 (e.g., the camera module 180 of FIG. 1). The plurality of cameras are illustrative, and embodiments are not limited by this disclosure. For example, the plurality of cameras may include a camera located on the opposite side to the first surface on which the first display 340 is located.

According to an embodiment, in the unfolded state 310b, the foldable electronic device 300 may provide a second preview on the second display 350 using at least one of a plurality of cameras. For example, at least one of the plurality of cameras may be the second camera 362 and/or the third camera 364 (e.g., the camera module 180 of FIG. 1). The plurality of cameras are illustrative, and embodiments are not limited by this disclosure. For example, the plurality of cameras may include a camera located on the opposite side to the second surface on which the second display 350 is located.

According to an embodiment, the second camera 362 and/or the third camera 364 may have different physical characteristics (e.g., aperture performance, focal length, telephoto lens, and/or wide angle lens) from the first camera 360. For example, the foldable electronic device 300 may provide a specific effect (e.g., Bokeh, out-focusing, and/or telephoto) by using the physical characteristics of the third camera 364. The position in which the first camera 360, the second camera 362, and/or the third camera 364 is disposed and/or the function of each of the cameras is illustrative, and embodiments of the disclosure are not limited thereto.

A user may manipulate the first preview through an area setting input for the first preview when the foldable electronic device 300 is in the folded state 310a. For example, to zoom in on a specific area of the first preview, the user may manipulate the first preview through a zoom-in input. The user may unfold the foldable electronic device 300 while the manipulated first preview is provided through the first display 340. In the unfolded state 310b, the foldable electronic device 300 may provide a preview using a camera and/or a display that is different from that in the folded state 310a. The second preview provided in the unfolded state 310b may have different characteristics than the first preview to the user. For example, the second display 350 on which the second preview is displayed may have higher resolution than the first display 340 on which the first preview is displayed. The user may be provided with the second preview having clearer image quality through the second display 250 in the unfolded state 310b.

Conventionally, when the foldable electronic device 300 is changed to the unfolded state 310b due to the unfolding operation, information about the user's area setting input for the first preview may be invalidated, or part of the information about the area setting input may be lost. For example, in the case where the user inputs a zoom-in input to one point on the first preview image, the second preview in which the zoom-in input is not reflected may be provided through the second display when the foldable electronic device 300 is changed to the unfolded state 310b. In another example, in the case where the user inputs a zoom-in input to one point on the first preview image, the second preview zoomed in based on a middle point of the second display irrespective of the position of the zoomed-in point on the first display may be provided when the foldable electronic device 300 is changed to the unfolded state 310*b*. Accordingly, continuity for operating the device for image photography (e.g., image capturing) intended by the user may be disrupted by the folding and unfolding operations.

According to certain embodiments to be described below, even when the form factor of the foldable electronic device 300 is changed due to the user's folding/unfolding operation, the foldable electronic device 300 may provide continuity for image photography intended by the user. For example, an edited state for the first preview in the folded state 310*a* of the foldable electronic device 300 may be maintained in the unfolded state 310*b*. For example, the foldable electronic device 300 may store, in the folded state 310*a*, information about an edge of an object in the first preview angle area, information about the position of the object in the first preview angle area and the ratio of the object to the first preview angle area, information about the resolution of a preview, and/or information about the user's zoom-in/zoom-out level and position and may use the stored information in the unfolded state 310*b*.

Figure 6:
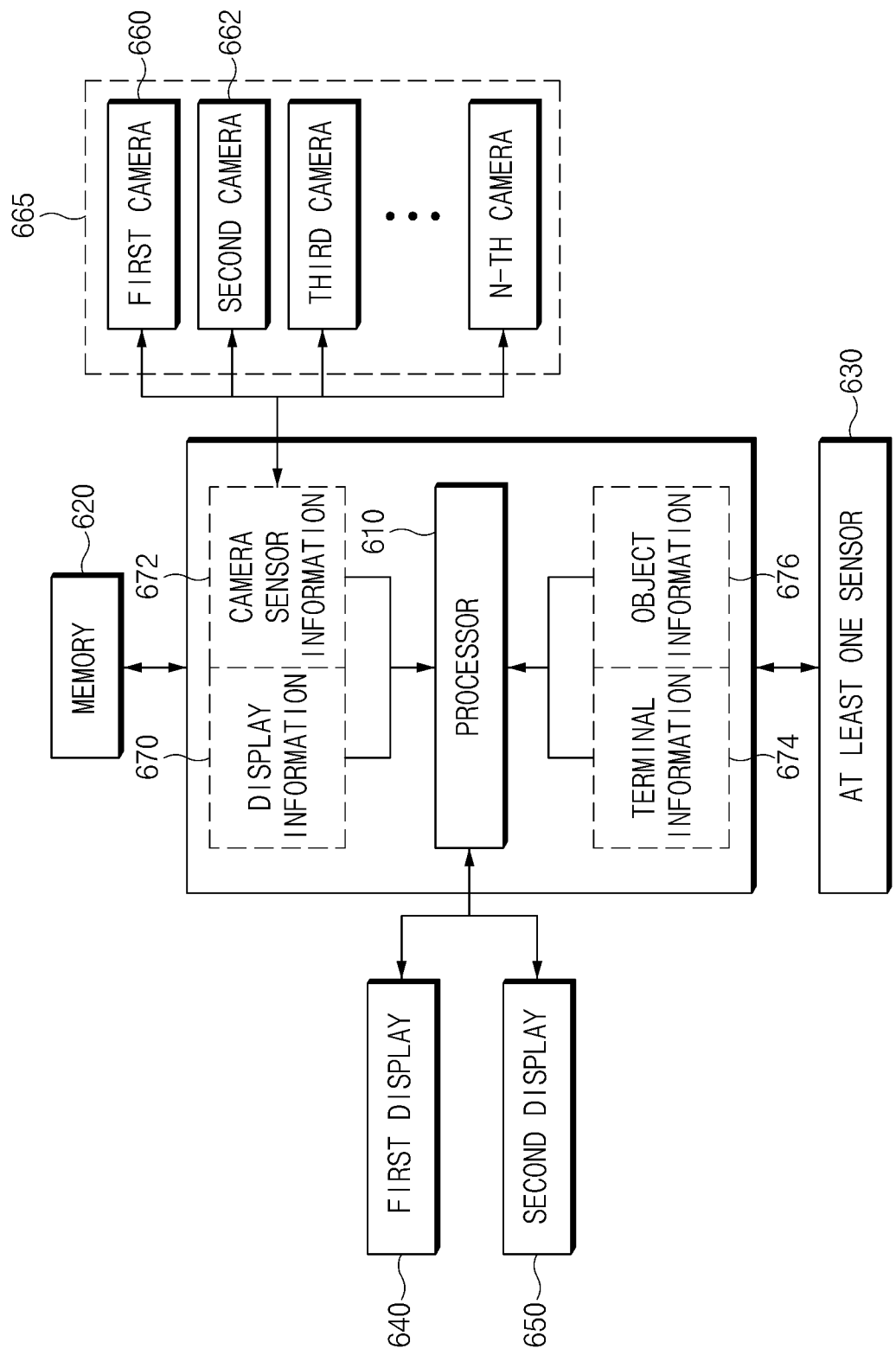
FIG. 6 is a block diagram illustrating a structure of a foldable electronic device according to an embodiment.

FIG. 6 is a block diagram illustrating a structure of a foldable electronic device according to an embodiment.

According to an embodiment, the foldable electronic device 600 (e.g., the electronic device 101 of FIG. 1) may include a processor 610, memory 620, at least one sensor 630, a first display 640, a second display 650, and/or a plurality of cameras 665. Embodiments are not limited by this disclosure. For example, the foldable electronic device 600 may further include components not illustrated in FIG. 6, or may not include at least some of the components illustrated in FIG. 6. For example, the foldable electronic device 600 may further include the battery 189 and/or the antenna module 197 of FIG. 1.

According to an embodiment, the processor 610 (e.g., the main processor 121 of FIG. 1) may execute software (e.g., the program 140 of FIG. 1) to control at least one other component (e.g., hardware and/or software components) of the foldable electronic device 600 operationally connected to the processor 610 and may perform various data processing or computation. The processor 610 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the first display 640 and the second display 650 (e.g., the display device 160 of FIG. 1) may visually provide information to the outside of the foldable electronic device 600. The first display 640 and the second display 650 may include touch circuitry configured to sense touches or a sensor circuit (e.g., a pressure sensor) configured to measure the magnitude of force generated by the touches.

According to an embodiment, the memory 620 (e.g., the memory 130 of FIG. 1) may store various data used by at least one component (e.g., the processor 610) of the foldable electronic device 600. One or more programs (e.g., the program 140 of FIG. 1) may be stored as software in the memory 620 and may include, for example, an operating system (e.g., 142 of FIG. 1), middleware (e.g., 144 of FIG. 1), or an application (e.g., 146 of FIG. 1). The data may include, for example, the program and input data or output data for commands related to the program.

According to an embodiment, the data may include information related to a preview provided using the plurality of cameras 165 of the foldable electronic device 600. For example, the data may include display information 670, camera sensor information 672, terminal information 674, and/or object information 676. For example, the display information 670 may include resolution information of the first display 640 and the second display 650. For example, the camera sensor information 672 may include resolution information and/or zoom-in/zoom-out level information of the plurality of cameras 665. For example, the terminal information 674 may include information about the folded/unfolded state of the foldable electronic device 600. For example, the object information 676 may include information about an object in the preview angle area. For example, the information about the object may include information about the size, type, and/or position of the object. The information about the size of the object may include information about the absolute pixel value of the object and information about the relative pixel value occupied by the object in the entire preview area. The information about the type of the object may include determination information about whether the object is a person, background, or an inanimate thing. The information about the position of the object may include information about the pixel position of the object and information about the relative position at which the object is located in the entire preview area.

According to an embodiment, the at least one sensor 630 (e.g., the sensor module 176 of FIG. 1) may sense (or detect) an operational state of the foldable electronic device 600 or an environmental state external to the foldable electronic device 600 (e.g., user state) and may generate an electrical signal or a data value that corresponds to the sensed state. According to an embodiment, the at least one sensor 630 may include, for example, a gesture sensor, a gyro sensor, a magnetic sensor, an acceleration sensor, a grip sensor, or a proximity sensor. The foldable electronic device 600 may sense the folded/unfolded state of the foldable electronic device 600 using the at least one sensor 600. For example, the foldable electronic device 600 may sense folding/unfolding of the foldable electronic device 600 using an acceleration sensor, a gyro sensor, an angular velocity sensor, an angle sensor, or a magnetic sensor based on a magnetic force. The type of the at least one sensor 600 is illustrative, and the at least one sensor 600 may further include any sensor capable of sensing folding/unfolding of the foldable electronic device 600.

According to an embodiment, the plurality of cameras 665 (e.g., the camera module 180 of FIG. 1) may take still images and videos. Among the plurality of cameras 665, the N-th camera may be referred to by the number of cameras included in the foldable electronic device 300. As such, referring to FIG. 6, the foldable electronic device 300 may include N cameras. According to an embodiment, the plurality of cameras 665 may include at least one of one or more lenses, image sensors, image signal processors, or flashes. According to an embodiment, the foldable electronic device 600 may include the plurality of cameras 665 having different properties and/or functions. In this case, for example, at least one of the plurality of cameras 655 may be a wide angle camera, and at least another one of the cameras 655 may be a telephoto camera. Similarly, at least one of the plurality of cameras 665 may be a front camera, and at least another one of the cameras 665 may be a rear camera.

According to an embodiment, the foldable electronic device 600 may include a foldable housing (e.g., 315 of FIG. 3) that is foldable about at least one axis, the first display 640 (e.g., the first display 340 of FIG. 3), the second display 650 (e.g., the second display 350 of FIG. 3), a first camera 660 (e.g., the first camera 360 of FIG. 3), a second camera 662 (e.g., the second camera 362 and/or the third camera 364 of FIG. 3), the at least one sensor 630, the memory 620, and/or the processor 610.

The first display 640 may be disposed on the first surface of the foldable housing 315. The second display 650 may be disposed on the second surface of the foldable housing 315.

The processor 610 may be functionally connected to the first display 640, the second display 650, the first camera 660, the second camera 662, the memory 620, and/or the at least one sensor 630. In the folded state 310a, the processor 610 may provide a first preview on the first display 640 using the first camera 660 and may receive an area setting input for the first preview through the first display 640. After receiving the area setting input, the processor 610 may sense unfolding of the foldable electronic device using the at least one sensor 630. In the unfolded state 310b, the processor 610 may be configured to provide a second preview corresponding to the area setting input through the second display 650 using the second camera 662. For example, the processor 610 may be further configured to generate information about the angle of view of the first preview based on the area setting input and provide the second preview corresponding to the information about the angle of view through the second display 650 using the second camera 662 in the unfolded state 310b.

According to an embodiment, the area setting input may include a zoom-in input or a zoom-out input based on an input of the user. In this case, the processor 610 may be further configured to provide, in the unfolded state 310b, the second preview zoomed in or zoomed out based on one point of the area setting input through the second display 650 using the second camera 662. For example, when the area setting input is the zoom-in input, the processor 610 may provide the zoomed-in second preview through the second display 650. The processor 610 may be further configured to provide the non-zoomed-in second preview through a sub-frame of the second display 650, and the sub-frame may be implemented by a partial area of the second display 650 (e.g., partial area on the zoomed-in second preview). The processor 610 may be further configured to remove the sub-frame when an input of the user is received in the area of the second display 650 other than the sub-frame through the second display 650.

According to an embodiment, the area setting input may include an input by which the user specifies an area including a specific object in a displaying area of the first preview. In the folded state 310a, the processor 610 may store information related to the position and ratio of the area including the specific object relative to the displaying area of the first preview. In the unfolded state 310b, the processor 610 may be further configured to correct the position and ratio of the area including the specific object relative to the displaying area of the second preview according to the position and ratio of the area including the specific object relative to the displaying area of the first preview and provide the corrected second preview through the second display 650. For example, the displaying area of the first preview may be a partial area of the maximum view angle area of at least one image obtained by the first camera 660, and the displaying area of the second preview may be a partial area of the maximum view angle area of at least one image obtained by the second camera 662.

According to an embodiment, the processor 610 may apply an image effect to the first preview in the folded state 310a. For example, the processor 610 may apply at least one image effect to the first preview depending on a user input and/or settings of a camera application. The processor 610 may provide the first preview having the image effect applied thereto through the first display 640. The processor 610 may be further configured to apply the image effect to the second preview in the unfolded state 310b and provide the second preview having the image effect applied thereto through the second display 650. For example, in the folded state 310a, the processor 610 may apply the image effect to the first preview based on properties of the first camera 660 and/or the first display 640 and may provide the first preview having the image effect applied thereto through the first display 640. The processor 610 may be further configured to apply, in the unfolded state 310b, the image effect to the second preview based on properties of the second camera 662 and/or the second display 650 and provide the second preview having the image effect applied thereto through the second display 650. For example, the processor 610 may convert the image effect set for the first camera 660 depending on the properties of the second camera 662 and may provide the second preview by applying the converted image effect.

Figure 7:
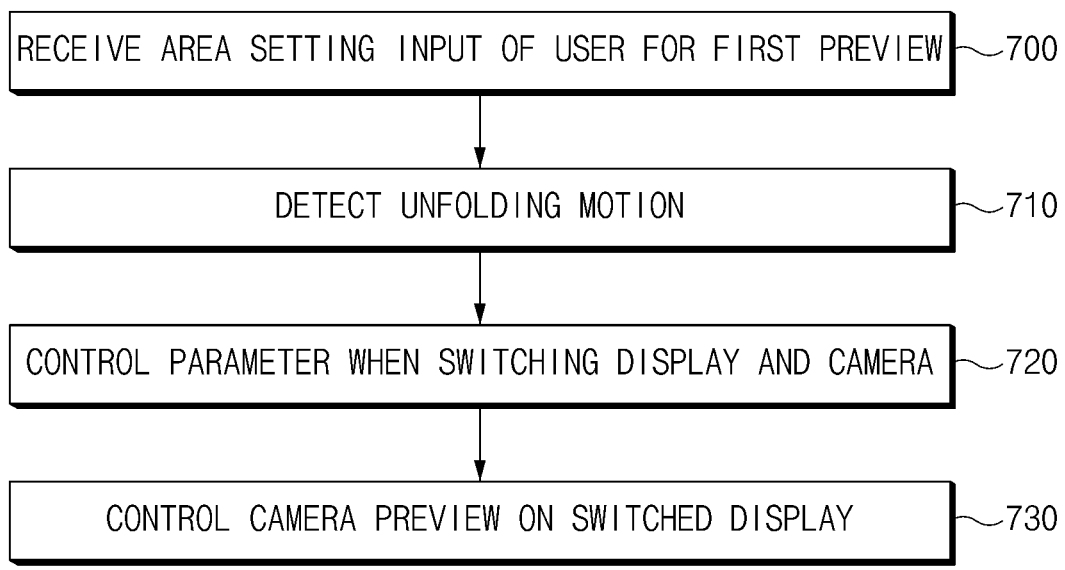
FIG. 7 is a flowchart illustrating a method of providing a preview by a foldable electronic device according to an embodiment.

FIG. 7 is a flowchart illustrating a method of providing a preview by a foldable electronic device according to an embodiment.

Operations shown in FIG. 7 may be performed by the foldable electronic device 600 of FIG. 6.

Referring to FIG. 7, in operation 700, the foldable electronic device (e.g., the foldable electronic device 600 of FIG. 6) may receive an area setting input of a user for a first preview through a first display (e.g., 640 of FIG. 6) in the folded state (e.g., 310a of FIG. 3). For example, the area setting input may include a zoom-in input or a zoom-out input based on the input of the user. In another example, the area setting input may include an input by which the user specifies an area including a specific object in the displaying area of the first preview.

In operation 710, the foldable electronic device 600 may sense (or detect) the unfolding operation of the foldable electronic device 600 using at least one sensor (e.g., the at least one sensor 630 of FIG. 6). For example, the at least one sensor 630 may include an angle sensor, a gyro sensor, an acceleration sensor, and/or a grip sensor. Due to the unfolding operation, a first camera (e.g., 660 of FIG. 6) and the first display 640 used by a processor (e.g., 610 of FIG. 6) to provide the first preview in the folded state 310a may be switched to a second camera (e.g., 662 of FIG. 6) and a second display (e.g., 650 of FIG. 6). In the unfolded state

310b, the processor 610 may provide a second preview using the second camera 662 and the second display 650.

In operation 720, the foldable electronic device 600 may perform parameter control when switching the displays and the cameras. For example, the foldable electronic device 600 may recognize properties (e.g., resolutions, normal, wide angles, and special photographic effects) of the switched cameras and properties (e.g., sizes and resolutions) of the switched displays. Specific description of the parameter control may be referred to by FIG. 12. In FIG. 7, for convenience of description, operation 720 is illustrated as being performed after operation 710. However, according to an embodiment, operation 720 may be performed in parallel in all of the operations in FIG. 7.

In operation 730, in the unfolded state 310b, the foldable electronic device 600 may provide the second preview corresponding to the area setting input through the second display 650 using the second camera 662. Specifically, an image obtained using the second camera 662 in the unfolded state 310b may be adjusted according to the user's setting (e.g., the area setting input) for the first preview. The foldable electronic device 600 may use information about the first preview to adjust the image obtained using the second camera 662. The information about the first preview may include information about the relative position of an object located on the displaying area of the first preview, information about a zoom-in/zoom-out level input by the user, information about the position of a zoom-in input that is input by the user, and information about the resolution of the first preview. The foldable electronic device 600 may provide the adjusted image as the second preview through the second display 650. In this case, the second preview may reflect the state set by the user in the first preview. For example, the second preview may be an image zoomed in or zoomed out based on one point corresponding to the area setting input for the first preview. In another example, the foldable electronic device 600 may recognize the relative position and ratio of an area including a specific object in the image obtained using the second camera 662, may correct the area including the specific object on the image obtained using the second camera 662 according to the relative position and ratio of the area including the specific object in the first preview, and may provide the corrected image as the second preview.

Figure 8:
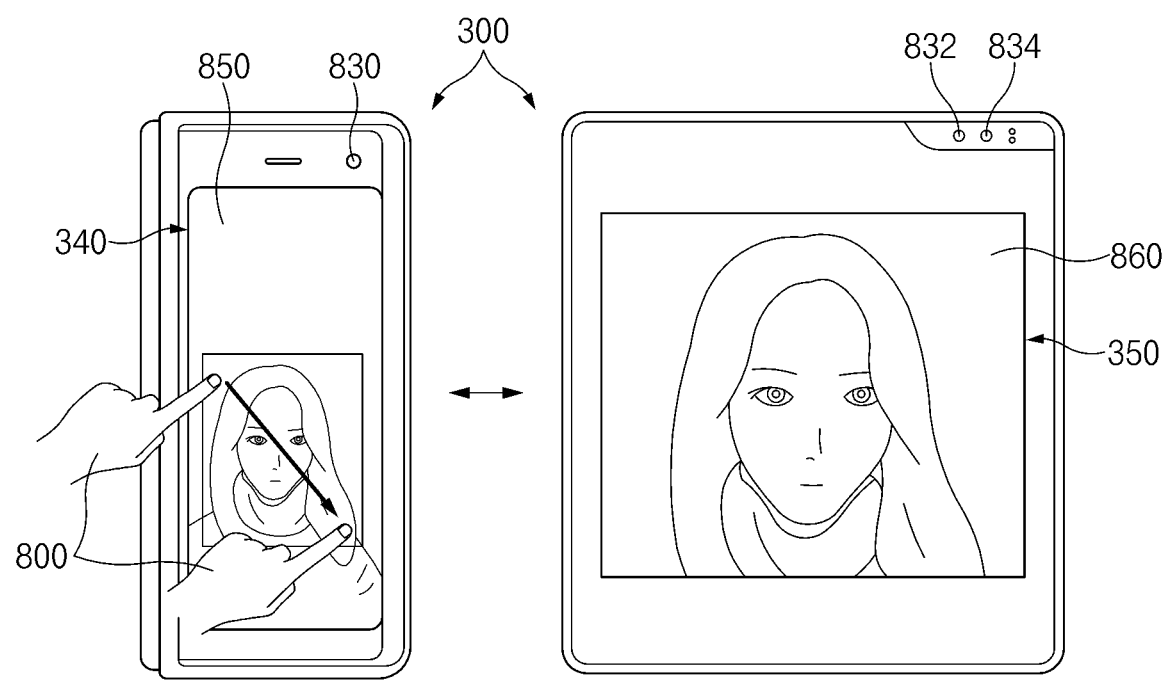
FIG. 8 illustrates providing a preview by a foldable electronic device using a front-facing camera according to an embodiment.

FIG. 8 illustrates providing a preview by a foldable electronic device using a front-facing camera according to an embodiment.

According to an embodiment, in the folded state 310a, the foldable electronic device (e.g., 300 of FIG. 3) may provide a first preview 850 through a first display (e.g., 340 of FIG. 3) using a first camera 830 (e.g., one of the plurality of cameras 665 of FIG. 6). For example, in the folded state 310a, the first camera 830 may be located on a first surface (e.g., the display surface of the first display 340) on which the first display 340 is located. A user may take an image (e.g., selfie) of him or herself located in front of the device using the first camera 830 located on the first surface.

According to an embodiment, to zoom in on the user's face, the user may input an area setting input 800 to the displaying area of the first preview 850. For example, to zoom in on a specific area in the displaying area of the first preview 850, the user may input a zoom-in input. The foldable electronic device 300 may receive the area setting input 800 through the first display 340. For example, the user may perform a pinch-out operation on one point of the specific area to input the zoom-in input. For example, the user may perform a double tap operation on one point of the specific area to input the zoom-in input. The double tap operation may refer to an operation where the user touches the display twice within a predetermined period of time. When receiving the zoom-in input through the first display 340, the foldable electronic device 300 may provide the first preview 850 zoomed in based on the one point as a new first preview 850. The user's area setting input 800 is illustrative, and embodiments are not limited by this disclosure. For example, the area setting input 800 may be a zoom-out input. For example, the user may perform a pinch-in operation on one point of the specific area to input the zoom-out input.

According to an embodiment, as described above, in the folded state 310a of the electronic device 300, the user may manipulate the first preview 850 provided through the first display 340 when taking a selfie. The user may unfold the foldable electronic device 300 to change the foldable electronic device 300 from the folded state 310a to an unfolded state 310b. The unfolding operation may occur while the first preview 850 is provided. Due to the unfolding operation, the first camera 830 and/or the first display 340 used by the foldable electronic device 300 in the folded state 310a may be switched.

According to an embodiment, the first camera 830 may be switched to a second camera 832 (e.g., the plurality of cameras 665 of FIG. 6) or a third camera 834 (e.g., the plurality of cameras 665 of FIG. 6). In the unfolded state 310b, the second camera 832 and/or the third camera 834 may be located on a second surface on which a second display 350 is located. In this case, the first surface on which the first display 340 is located may be located on the opposite side to the second surface. The first camera 830, the second camera 832, and/or the third camera 834 may have different functions due to different physical characteristics thereof. For example, the first camera 830 may provide a wide angle of view using a wide angle lens. But the second camera 832 may use an ultra wide lens to provide a wider angle of view than the wide angle lens. For example, the third camera 834 may provide a bokeh function of emphasizing a specific object. The number, performances, and/or functions of cameras are illustrative, and embodiments are not limited by this disclosure.

According to an embodiment, the first display 340 may be switched to the second display (e.g., 350 of FIG. 3). The first display 340 and the second display 350 may have different physical characteristics. For example, the second display 350 may occupy a wider area than the first display 340. For example, the resolution of the second display 350 may be higher than the resolution of the first display 340.

According to an embodiment, to use the second preview 860 having higher image quality and resolution than the first preview 850, the user may change the form factor of the foldable electronic device 300 to the unfolded state 310b. To provide continuity of the preview to the user, the foldable electronic device 300 may provide, in the unfolded state 310b, the second preview 860 corresponding to the area setting input 800 for the first preview 850. For example, when the user inputs a zoom-in input based on one point to the displaying area of the first preview 850 in the folded state 310a, the foldable electronic device 300 may obtain an image using the second camera 832, may zoom in on the obtained image based on one point corresponding to the one point, and may provide the zoomed-in image as the second preview 860.

According to an embodiment, the foldable electronic device 300 may control a plurality of parameters to provide the second preview 860 corresponding to the area setting input 800 for the first preview 850. For example, the plurality of parameters may include display information (e.g., 670 of FIG. 6), camera sensor information (e.g., 672 of FIG. 6), terminal information (e.g., 674 of FIG. 6), and/or object information (e.g., 676 of FIG. 6). Description of the plurality of parameters may be referred to by FIG. 6. Detailed description of the control of the plurality of parameters may be referred to by FIG. 12.

Figure 9:
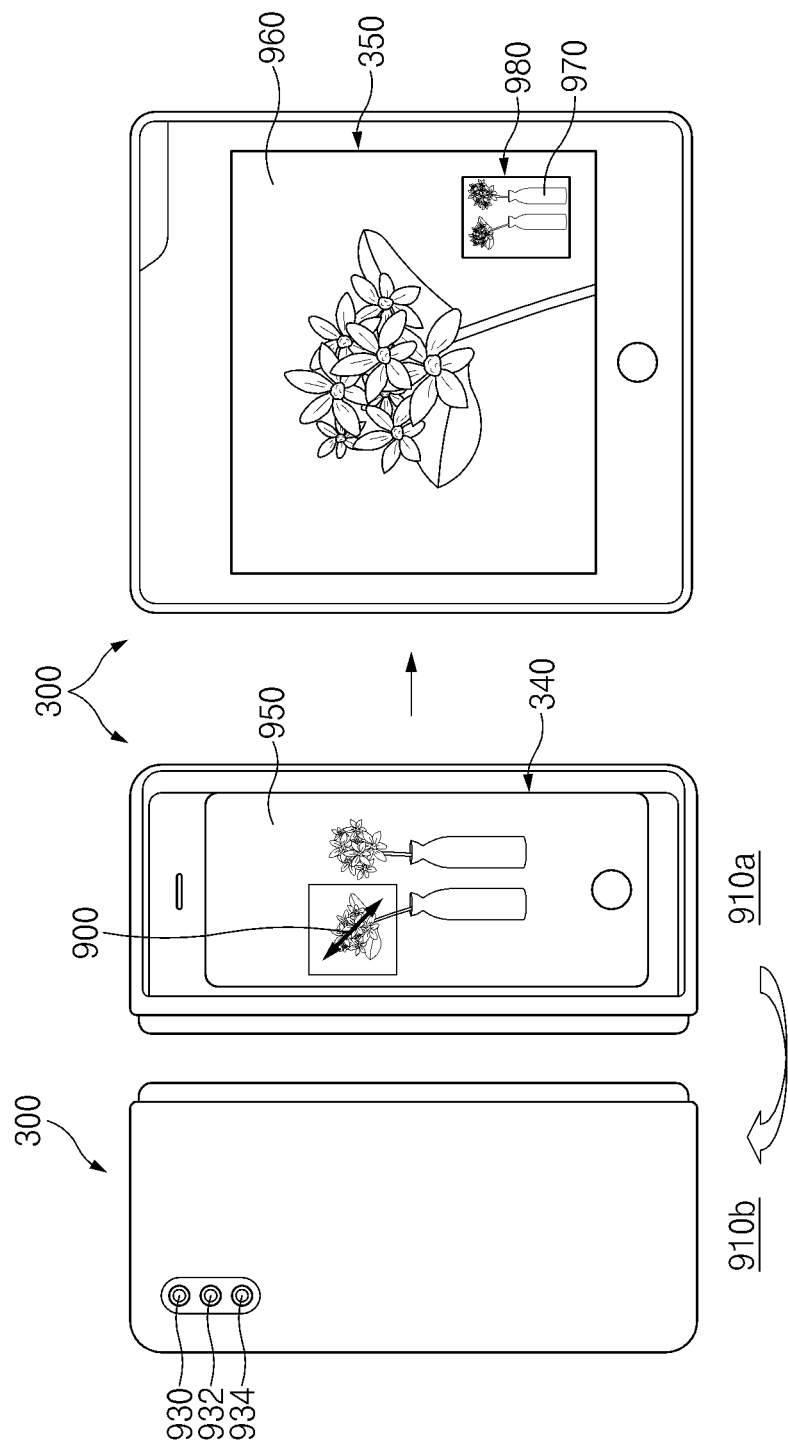
FIG. 9 illustrates providing a preview by a foldable electronic device using one or more rear-facing cameras according to an embodiment.

FIG. 9 illustrates providing a preview by a foldable electronic device using one or more rear-facing cameras according to an embodiment.

According to an embodiment, in the folded state 310*a*, the foldable electronic device (e.g., 300 of FIG. 3) may provide a first preview 950 through a first display (e.g., 340 of FIG. 3) using a first camera 930 (e.g., one of the plurality of cameras 665 of FIG. 6). In the folded state 310*a*, the first camera 930 may be located on the opposite side 910*b* to the first surface 910*a* on which the first display 340 is located. The user may take an image of an object behind the device using the first camera 930 located on the opposite side 910*b* to the first surface.

According to an embodiment, to zoom in on the object, the user may input an area setting input 900 to the displaying area of the first preview 950. For example, to zoom in on a specific area in the displaying area of the first preview 950, the user may input a zoom-in input. For a description of the area setting input 900, refer to the description of the area setting input 800 of FIG. 8.

According to an embodiment, as described above, in the folded state 310*a* of the electronic device 300, the user may manipulate the first preview 950 provided through the first display 340. The user may unfold the foldable electronic device 300 to change the foldable electronic device 300 from the folded state 310*a* to the unfolded state 310*b*. The unfolding operation may occur while the first preview 850 is provided. Due to the unfolding operation, the first camera 930 and/or the first display 340 used by the foldable electronic device 300 in the folded state 310*a* may be switched.

According to an embodiment, the first camera 930 may be switched to a second camera 932 or a third camera 934 (e.g., the plurality of cameras 665 of FIG. 6). In the unfolded state 310*b*, the second camera 932 and/or the third camera 934 may be located on the opposite side to the second surface on which a second display 350 is located. For example, the second camera 932 and/or the third camera 934 may be located on the same surface as the first camera 930. The first camera 930, the second camera 932, and/or the third camera 934 may have different functions due to different physical characteristics thereof. For example, the first camera 930 may provide a wide angle of view using a wide angle lens. For example, the second camera 932 may provide images having a deep depth of field using a telephoto lens having a long focal length. For example, the third camera 934 may use an ultra wide lens to provide a wider angle of view than the wide angle lens. The number, performances, and/or functions of cameras are illustrative, and embodiments are not limited by this disclosure.

According to an embodiment, the first display 340 may be switched to the second display (e.g., 350 of FIG. 3). The first display 340 and the second display 350 may have different physical characteristics. For example, the second display 350 may occupy a wider area than the first display 340. For example, the resolution of the second display 350 may be higher than the resolution of the first display 340.

According to an embodiment, to use the second preview 960 having higher image quality and resolution than the first preview 950, the user may change the form factor of the foldable electronic device 300 to the unfolded state 310*b*. To provide continuity of the preview to the user, the foldable electronic device 300 may provide, in the unfolded state 310*b*, the second preview 960 corresponding to the area setting input 900 for the first preview 950. For example, when the user inputs a zoom-in input based on one point to the displaying area of the first preview 950 in the folded state 310*a*, the foldable electronic device 300 may obtain an image using the second camera 932, may zoom in on the obtained image based on one point corresponding to the one point, and may provide the zoomed-in image as the second preview 960.

According to an embodiment, the foldable electronic device 300 may control a plurality of parameters to provide the second preview 960 corresponding to the area setting input 900 for the first preview 950. For example, the plurality of parameters may include display information (e.g., 670 of FIG. 6), camera sensor information (e.g., 672 of FIG. 6), terminal information (e.g., 674 of FIG. 6), and/or object information (e.g., 676 of FIG. 6). Description of the plurality of parameters may be referred to by FIG. 6. Description of the control of the plurality of parameters may be referred to by FIG. 12.

According to an embodiment, the foldable electronic device 300 may provide the second preview 960 corresponding to the zoom-in input of the user for the first preview 950 through the second display 350 and may provide a non-zoomed-in second preview 970 together through a sub-frame 980. The non-zoomed-in second preview 970 may be the entire image obtained by the foldable electronic device 300 using the second camera 932. The sub-frame 980 may be referred to as a displaying area that occupies a partial area of the second display 350. The size of the sub-frame 980 and the position and/or ratio of the sub-frame 980 in the second display are illustrative, and embodiments are not limited by this disclosure.

According to an embodiment, when the user executes a photography function of the foldable electronic device 300, a still image or a video stored by the foldable electronic device 300 may be represented by the non-zoomed-in second preview 970 provided through the sub-frame 980. The user may perform the embodiment of FIG. 9 to know what the focus of a specific area on the non-zoomed-in second preview 970 is like or to identify in detail a specific object on the non-zoomed-in second preview 970.

Figure 10:
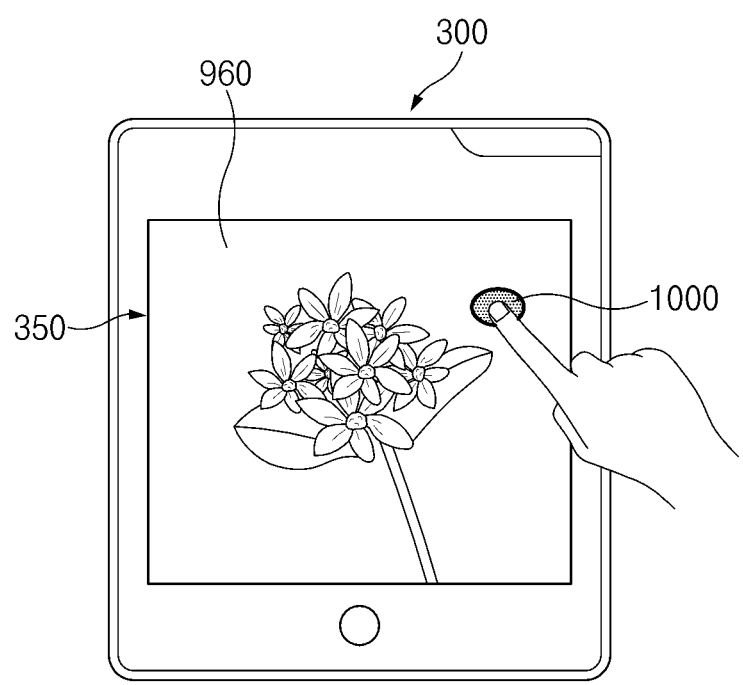
FIG. 10 illustrates a method of selecting a second preview by a user in an unfolded state according to an embodiment.

FIG. 10 illustrates a method of selecting a second preview by a user in an unfolded state according to an embodiment.

To the extent components in FIG. 10 are the same as or similar to the components shown in FIG. 9, duplicative description is omitted.

According to an embodiment, the foldable electronic device 300 may remove the sub-frame 980 by receiving a user input 1000 in the displaying area of the second display 350 outside the sub-frame 980 of FIG. 9. For example, the user input 1000 may include a touch, a double tap, and/or a scroll input on the second display 350. The user input 1000 is illustrative, and embodiments are not limited by this disclosure. FIG. 10 illustrates a state in which the foldable electronic device 300 removes the sub-frame 980 after receiving the user input.

According to an embodiment, the foldable electronic device 300 may provide only the second preview 960 through the second display 350 after the sub-frame 980 is removed. In this case, the foldable electronic device 300 may obtain the second preview 960 as a still image or a video when the user executes a photography function.

Figure 11:
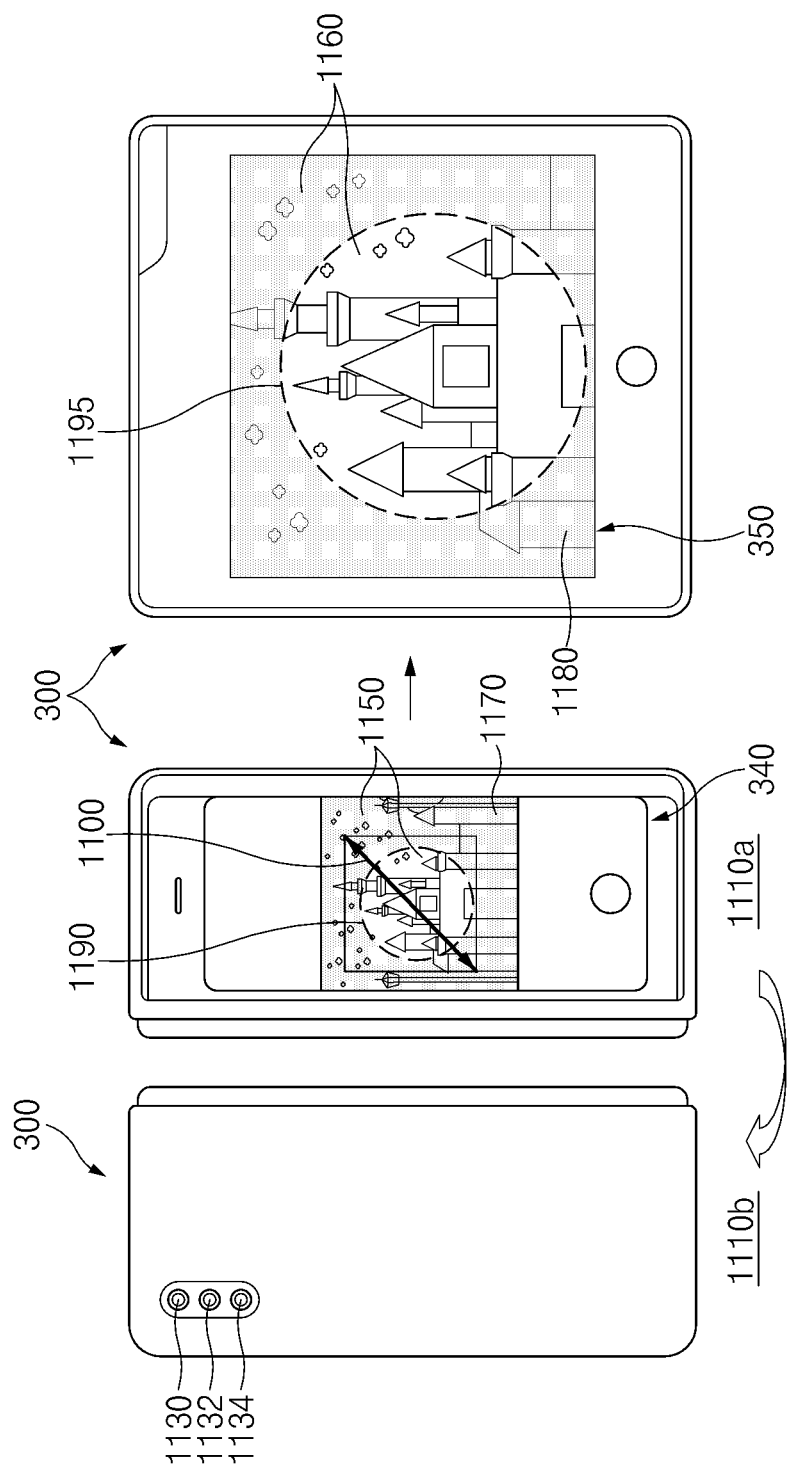
FIG. 11 illustrates providing a preview having an image effect applied thereto by a foldable electronic device according to an embodiment.

FIG. 11 illustrates providing a preview having an image effect applied thereto by a foldable electronic device according to an embodiment.

According to an embodiment, in the folded state 310a, the foldable electronic device (e.g., 300 of FIG. 3) may provide a first preview 1150 through a first display (e.g., 340 of FIG. 3) using a first camera 1130 (e.g., one of the plurality of cameras 665 of FIG. 6). In the folded state 310a, the first camera 1130 may be located on the opposite side 1110b to the first surface 1110a on which the first display 340 is located. The user may take an image of an object behind the device using the first camera 1130 located on the opposite side 1110b to the first surface.

The foldable electronic device 300 may apply an image effect (e.g., Live focus) to the first preview 1150. For example, when a Live focus effect is applied to the image provided as the first preview 1150, the user may perform bokeh photography on a specific object. Through the bokeh photography, the foldable electronic device 300 may obtain an image in which the specific object of the first preview 1150 is emphasized. Specifically, the foldable electronic device 300 may make a specific object area 1190 on the first preview 1150 clear and may blur the remaining area 1170 other than the specific object area 1190. The application of the image effect may be processed in software. The image effect is illustrative, and embodiments are not limited by this disclosure. For example, the image effect may include an effect using augmented reality (AR) technology, a pixel color correction effect, and/or an object edge correction effect.

According to an embodiment, to zoom in on the object whose image is captured, the user may input an area setting input 1100 to the displaying area of the first preview 1150. For example, the area setting input 1100 may be a zoom-in input. For a description of the area setting input 1100, refer to the description of the area setting input 800 of FIG. 8.

As described above, in the folded state 310a of the electronic device 300, the user may manipulate the first preview 1150 provided through the first display 340. The user may unfold the foldable electronic device 300 to change the foldable electronic device 300 from the folded state 310a to the unfolded state 310b. The unfolding operation may occur while the first preview 850 is provided. Due to the unfolding operation, the first camera 830 and/or the first display 340 used by the foldable electronic device 300 in the folded state 310a may be switched.

According to an embodiment, the first camera 1130 may be switched to a second camera 1132 or a third camera 1134 (e.g., the plurality of cameras 665 of FIG. 6). In the unfolded state 310b, the second camera 1132 and/or the third camera 1134 may be located on the opposite side to the second surface on which a second display 350 is located. For example, the second camera 1132 and/or the third camera 1134 may be located on the same surface as the first camera 1130. The first camera 1130, the second camera 1132, and/or the third camera 1134 may have different functions due to different physical characteristics thereof. For example, the first camera 1130 may provide a wide angle of view using a wide angle lens. For example, the second camera 1132 may be a camera module including a depth sensor. The second camera 1132 may obtain pixel depth information based on the position of an object in three-dimensional space using the depth sensor. This way, the foldable electronic device 300 may obtain an image including the pixel depth information. For example, the third camera 1134 may use an ultra wide lens to provide a wider angle of view than the wide angle lens. The number, performances, and functions of cameras are illustrative, and embodiments are not limited by this disclosure.

According to an embodiment, the first display 340 may be switched to the second display (e.g., 350 of FIG. 3). The first display 340 and the second display 350 may have different physical characteristics. For example, the second display 350 may occupy a wider area than the first display 340. For example, the resolution of the second display 350 may be higher than the resolution of the first display 340.

According to an embodiment, to use a second preview 1160 having higher image quality and resolution than the first preview 1150 provided in the folded state 310a, the user may change the form factor of the foldable electronic device 300 to the unfolded state 310b. To provide continuity to the user, the foldable electronic device 300 may provide, in the unfolded state 310b, the second preview 1160 that corresponds to the area setting input 1100 for the first preview 1150 and the image effect applied to the first preview 1150.

According to an embodiment, when the user inputs a zoom-in input based on one point to the displaying area of the first preview 950 in the folded state 310a, the foldable electronic device 300 may obtain an image using the second camera 1132, may zoom in on the obtained image based on one point corresponding to the one point, and may provide the zoomed-in image as the second preview 1160.

The foldable electronic device 300 may control a plurality of parameters to provide the second preview 1160 corresponding to the area setting input 800 for the first preview 1150. For example, the plurality of parameters may include display information (e.g., 670 of FIG. 6), camera sensor information (e.g., 672 of FIG. 6), terminal information (e.g., 674 of FIG. 6), and/or object information (e.g., 676 of FIG. 6). Description of the plurality of parameters may be referred to by FIG. 6. Description of the control of the plurality of parameters may be referred to by FIG. 12.

The foldable electronic device 300 may apply the image effect applied to the first preview 1150 in the folded state 310a to the second preview 1160. For example, due to the unfolding of the foldable electronic device 300, the first camera 1130 may be switched to the second camera 1132. The foldable electronic device 300 may obtain an image including pixel depth information using the depth sensor included in the second camera 1132. The foldable electronic device 300 may recognize information about physical characteristics of the cameras (e.g., the sizes of lens and the types of sensors) before and after the unfolding and information about performances (e.g., screen sizes and resolutions) of the displays. To apply the same image effect (e.g., Live focus) as that applied to the first preview 1150 to the second preview 1160, the foldable electronic device 300 may takin into account the performances of the camera and the display switched when the unfolding operation is performed. Depending on the performances of the camera and the display used in the unfolded state 310b, the processor 610 of the foldable electronic device 300 may perform correction for application of the image effect to each pixel, which may be different for when the image effect is applied to the first preview 1150 in the folded state 310a. The above-described correction may be processed in software. For example, when a specific object area 1195 on the second preview 1160 corresponds to the specific object area 1190 on the first preview 1150, the specific object area 1195 on the second preview 1160 may be expressed as sharply as the specific object area 1190 on the first preview 1150. The processor 610 may sharply express the specific object area 1195 on the second preview 1160 that corresponds to the specific object area 1190 on the first preview 1150. However, the first preview 1150 and the second preview 1160 differ from each other in terms of resolution information and pixel information, and therefore correction for each pixel may be differently applied for application of the same image effect. The processor 610 may take into account resolution information and ratio information of the displays together as well as the performances of the cameras. Furthermore, the second camera 1132 may use the depth sensor, and thus the degree of depth correction for the second preview 1160 may be smaller. A method of blurring the remaining area 1180 on the second preview 1160 that corresponds to the remaining area 1170 on the first preview 1150 can be similarly implemented.

Referring to the embodiment disclosed in FIG. 11, the user may use the second preview 1160 to which the same image effect is applied even after the unfolding of the foldable electronic device 300 and that is zoomed in based on one specified point in the first preview 1150.

Figure 12:
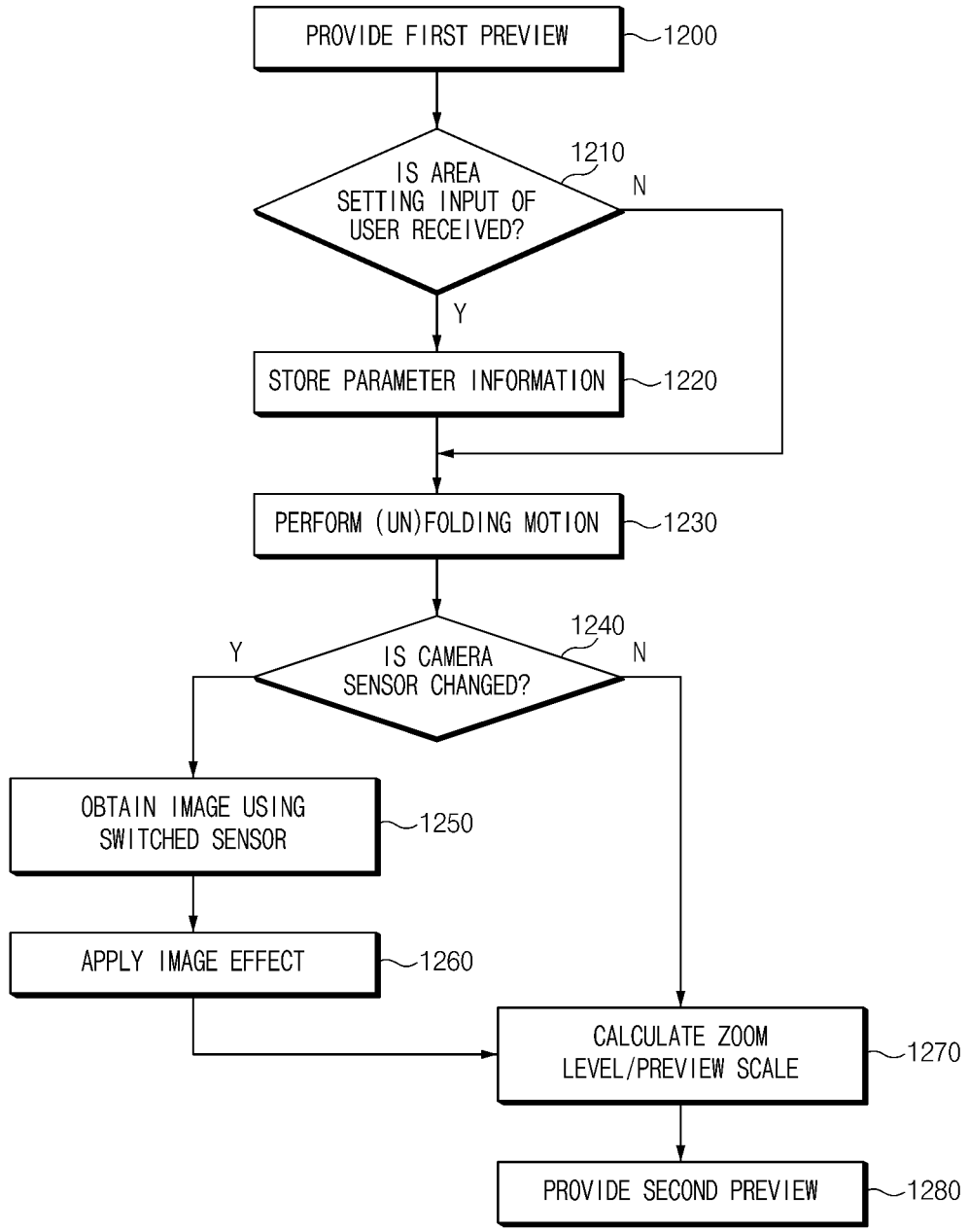
FIG. 12 is a flowchart illustrating parameter control of a foldable electronic device when a second preview corresponding to an area setting input is provided according to an embodiment.

FIG. 12 is a flowchart illustrating parameter control of a foldable electronic device when a second preview corresponding to an area setting input is provided according to an embodiment.

Description of FIG. 12 may be understood in the context of the descriptions of FIGS. 3 to 11. For example, the parameter control may be performed by a processor (e.g., 610 of FIG. 6) of the foldable electronic device.

Referring to FIG. 12, in operation 1200, the processor 610 may provide a first preview on a first display 340 using a first camera.

In operation 1210, the processor 610 may receive an area setting input of a user for the first preview through the first display 340. For example, the area setting input of the user may include a zoom-in/zoom-out input. The processor 610 may proceed to operation 1230 when not receiving the area setting input of the user (e.g., 1210-N). The processor 610 may proceed to operation 1220 when receiving the area setting input of the user (e.g., 1210-Y).

In operation 1220, the processor 610 may store information about a parameter. The information about the parameter may include display information 670, camera sensor information 672, terminal information 674, and/or object information 676. For example, in relation to a zoom-in input, the processor 610 may store, in memory (620 of FIG. 6), coordinate information of a touch input of the user, the level of pinch zoom, and/or information about a relative position between an object and a touch input that is recognized using a sensor (e.g., the sensor module 176 of FIG. 1). Prior to operation 1220, the processor 610 may store part of the information about the parameter in the memory 620 in advance. For example, information about the performances of the first display 340 and a second display 350 and/or information about a plurality of cameras included in the foldable electronic device 300 may be stored in the memory 620 in advance. The information about the parameter may be quantified and may be used as a parameter value. The type of the information about the parameter is illustrative, and embodiments are not limited by this disclosure. For example, the parameter may or may not include at least part of information stored and/or used by the foldable electronic device 300 to provide a camera preview.

In operation 1230, the user may unfold the foldable electronic device 300 to change the form factor of the foldable electronic device 300 from a folded state 310a to an unfolded state 310b. The processor 610 may sense the folded/unfolded state of the foldable electronic device 600 using at least one sensor 630. For example, the processor 610 may sense folding/unfolding of the foldable electronic device 600 using an acceleration sensor, a gyro sensor, an angular velocity sensor, an angle sensor located on a hinge, or a magnetic sensor based on a magnetic force. Due to the unfolding of the foldable electronic device 300, the first camera and the first display used by the processor 610 to provide the preview may be switched. The switched camera and the switched display may have different performances and functions than the camera and the display in the folded state 310a. As the camera and the display are switched, the processor 610 may change the parameter value.

In operation 1240, the processor 610 may determine whether the camera sensor is changed due to the unfolding. For example, due to the unfolding, the first camera may be switched to a second camera including a depth sensor. In this case, the camera sensor may be changed to the depth sensor, and the processor 610 may obtain an image including pixel depth information using the depth sensor. The processor 610 may proceed to operation 1270 when the camera sensor is not changed due to the unfolding (1240-N). The processor 610 may proceed to operation 1250 when the camera sensor is changed due to the unfolding (1240-Y).

In operation 1250, the processor 610 may load physical characteristics (e.g., maximum resolution, supported ratio for each resolution, and the like) of the changed camera sensor (e.g., depth sensor). Prior to operation 1250, the processor 610 may store information about physical characteristics of the camera sensor in the memory 620 in advance. The information about the physical characteristics of the camera sensor may be reflected in the parameter value. The processor 610 may proceed to operation 1260 after loading the physical characteristics of the camera sensor.

In operation 1260, the processor 610 may apply an image effect (e.g., Live focus) to an image obtained by the switched camera and the switched sensor. The processor 610 may set the resolution and/or the displaying ratio of the second preview in the unfolded state 310b in response to settings of an image effect applied to the first preview.

In operation 1270, the processor 610 may calculate a zoom-in/zoom-out level and/or a preview scale based on the parameter value, and in operation 1280, the processor 610 may provide the second preview. For example, the processor 610 may calculate horizontal and vertical magnification ratios of the second preview depending on a zoom-in input, which may be different than in the folded state 310a, using a parameter value in which resolution information of the second display is reflected. In FIG. 12, for convenience of description, operation 1270 is illustrated as being performed after operations 1250 and 1260. However, according to an embodiment, operation 1270 may be performed before operation 1250 and/or operation 1260, or may be performed in parallel.

Figure 13:
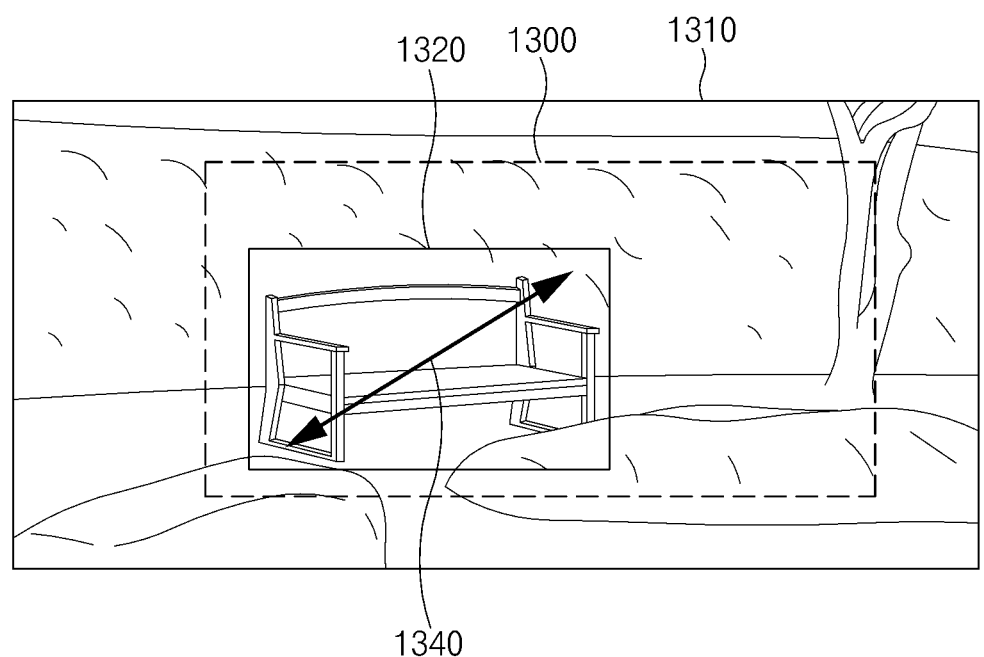
FIG. 13 illustrates the maximum angle of view of a camera and the angle of view of a preview provided through a display according to an embodiment.

FIG. 13 illustrates the maximum angle of view of a camera and the angle of view of a preview provided through a display according to an embodiment.

According to an embodiment, the size of a first maximum view angle area 1310 that a foldable electronic device (e.g., 300 of FIG. 3) can capture using a first camera (e.g., the plurality of cameras 665 of FIG. 6) may differ from the size of a view angle area 1300 of a first preview provided through a first display (e.g., the first display 340 of FIG. 3). For example, the size of the first maximum view angle area 1310 may be greater than the size of the view angle area 1300 of the first preview.

According to an embodiment, the user may specify a desired first object area 1320 in the view angle area 1300 of the first preview provided by the foldable electronic device 300. For example, an input 1340 by which the user specifies the first object area 1320 may be a touch on the object area and/or a pinch-out operation on the display. In another example, even when there is no user input, the foldable electronic device 300 may set the first object area 1320 by recognizing a specific object on the view angle area 1300 of the first preview. The method by which the first object area 1320 is set is illustrative, and embodiments are not limited by this disclosure.

According to an embodiment, a shake of the foldable electronic device 300 may occur due to the folding/unfolding operation of the user. Due to the shake, photography composition intended by the user in the folded state 310*a* may not be maintained in the unfolded state 310*b*. The foldable electronic device 300 may correct the shake of the foldable electronic device 300 due to the folding/unfolding operation using the difference in size between the maximum view angle area that the camera can capture and the view angle area of the preview.

Figure 14:
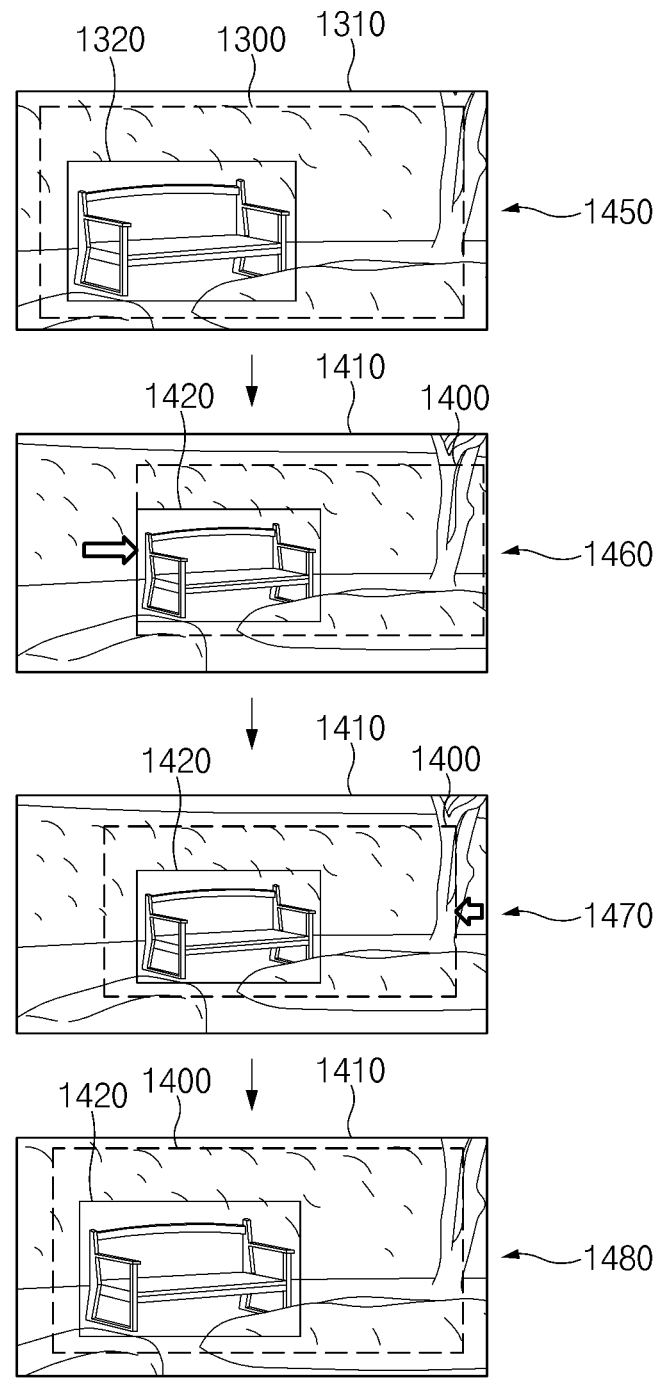
FIG. 14 illustrates a method of correcting the composition of a preview when a shake of a foldable electronic device is less than a threshold value according to an embodiment.

FIG. 14 illustrates a method of correcting the composition of a preview when a shake of a foldable electronic device is less than a threshold value according to an embodiment.

Both correction of a shake caused by the folding operation of the user and correction of a shake caused by the unfolding operation of the user may be described in the embodiment of FIG. 14. The following description is focused on the correction of the shake caused by the unfolding operation. Descriptions of reference numerals identical to those in FIG. 13 in the reference numerals in FIG. 14 may be referred to by the description of FIG. 13.

According to an embodiment, FIG. 14 illustrates the case in which a shake caused by unfolding of the foldable electronic device 300 that is less than the threshold value. "Less than the threshold value" may refer to the case in which the range of movement of the foldable electronic device 300 due to the unfolding does not deviate from the first maximum view angle area 1310. For example, when the first object area 1320 is still completely included in the first maximum view angle area 1310 in the unfolded state 310*b*, the shake of the foldable electronic device 300 may be less than the threshold value.

According to an embodiment, first composition 1450 represents screen composition set by the user in the folded state 310*a*. In the first composition 1450, the first maximum view angle area 1310 that a first camera can capture may be wider than the view angle area 1300 of a first preview. The user may specify the first object area 1320 in the first composition 1450. The foldable electronic device 300 may provide an image corresponding to the view angle area 1300 of the first preview through a first display.

Second composition 1460 represents screen composition provided through a camera and a display to which the camera and the display of the foldable electronic device 300 are switched due to the unfolding operation of the user. Due to the switching of the camera and the display and the shake of the foldable electronic device 300 in the unfolding operation, the relative position and the size ratio of the view angle area 1300 of the first preview and the first object area 1320 set by the user in the first composition 1450 may be changed. For example, a second object area 1420 may be located on the left side of a view angle area 1400 of a second preview in the unfolded state 310*b*, as compared with when the foldable electronic device 300 is in the folded state 310*a*.

Third composition 1470 represents correction of the shake of the foldable electronic device 300. A second maximum view angle area 1410 that the foldable electronic device can capture using the second camera may be wider than the view angle area 1400 of the second preview, and thus the foldable electronic device 300 may move the view angle area 1400 of the second preview within a range within the second maximum view angle area 1410. For example, to allow the relative position and the size ratio of the view angle area 1400 of the second preview and the second object area 1420 to remain the same as those in the folded state 310*a*, the foldable electronic device 300 may move the view angle area 1400 of the second preview up, down, left, and right in the second maximum view angle area 1410. Referring to the third composition 1470, as the second object area 1420 is moved leftward relative to the view angle area 1400 of the second preview due to the shake of the foldable electronic device 300, the foldable electronic device 300 may correct the composition by moving the view angle area 1300 of the second preview to the left.

Fourth composition 1480 represents composition in which the shake of the foldable electronic device 300 is corrected. The user may be provided with a preview having the same composition as that before the unfolding, by correcting the view angle area 1400 of the second preview based on the relative position information of the second object area 1420 as described above. For example, the relative position and the size ratio of the view angle area 1300 of the first preview and the first object area 1320 in the first composition 1450 may be the same as the relative position and the size ratio of the view angle area 1300 of the second preview and the second object area 1320 after the unfolding. In another example, when a display and a camera are switched due to unfolding, physical characteristics of the display and the camera may be changed, and therefore the relative positions and the size ratios of view angle areas of previews and object areas before and after the unfolding may not be the same as each other despite correction of a shake. Even in this case, the user may feel continuity between screen composition of a second preview in which the shake is corrected and screen composition before the unfolding.

Figure 15:
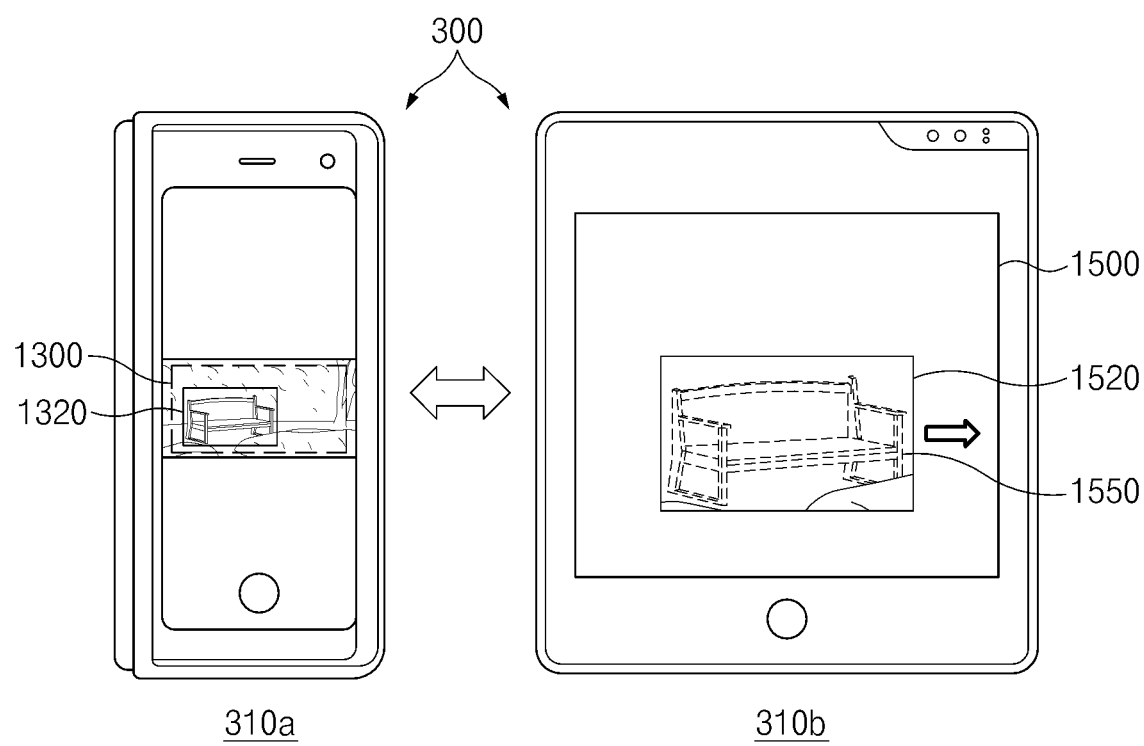
FIG. 15 illustrates a method of providing a composition guide of a preview when a shake of a foldable electronic device is greater than or equal to a threshold value according to an embodiment.

FIG. 15 illustrates a method of providing a composition guide of a preview when a shake of a foldable electronic device is greater than or equal to a threshold value according to an embodiment.

Both providing a composition guide depending on a shake caused by the folding operation of the user and providing a composition guide depending on a shake caused by the unfolding operation of the user may be described in the embodiment of FIG. 15. The following description is focused on the providing of the composition guide depending on the shake caused by the unfolding operation. Descriptions of reference numerals identical to those in FIG. 13 among reference numerals in FIG. 15 may be referred to by the description of FIG. 13.

According to an embodiment, FIG. 15 illustrates the case in which a shake caused by unfolding of the foldable electronic device 300 is greater than or equal to the threshold value. "Greater than or equal to the threshold value" may refer to the case in which the range of movement of the foldable electronic device 300 due to the unfolding deviates from the first maximum view angle area 1310. For example, when the view angle area 1500 of the second preview is completely outside from the first maximum view angle area 1310 in the unfolded state 310*b*, the shake of the foldable electronic device 300 may be greater than or equal to the threshold value.

According to an embodiment, when the foldable electronic device 300 is used in the folded state 310*a*, the user may specify a first object area 1320. A method of specifying the first object area 1320 may be referred to by the description of FIG. 13. The foldable electronic device 300 may store information about an object. For example, the foldable electronic device 300 may store information about an edge of the object in memory (e.g., the memory 130 of FIG. 1).

Due to the unfolding operation of the user, a camera and a display of the foldable electronic device 300 may be switched, and the relative position and the size ratio of the view angle area 1300 of a first preview and the first object area 1320 set by the user in the folded state 310*a* may be changed. In the case where a shake of the foldable electronic device 300 is greater than or equal to the threshold value when the user unfolds the foldable electronic device 300, the foldable electronic device 300 may provide a composition guide to enable the user to find screen composition in the folded state 310*a*. For example, due to the unfolding, a second object area 1520 corresponding to the first object area 1320 may not be included in the view angle area 1500 of the second preview. For example, the view angle area 1500 of the second preview may include only a portion of the second object area 1520.

In the unfolded state 310*b*, the foldable electronic device 300 may load the edge information of the object stored in the memory 130. In the unfolded state 310*b*, the foldable electronic device 300 may provide an edge shape 1550 of the object as the composition guide in a specific position on the view angle area 1500 of the second preview, based on the edge information of the object. For example, the specific position may be a position on the view angle area 1500 of the second preview that corresponds to information on the position and ratio of the first object area 1320 relative to the view angle area 1300 of the first preview.

The composition guide may lead the user to find the screen composition in the folded state 310*a*. The foldable electronic device 300 may obtain position information of the actual object, may obtain direction information about the position of the actual object with respect to the edge shape 1550 of the object, and may display the direction information about the position of the object with an arrow near the edge shape 1550. The position information of the actual object may be obtained by a sensor of the foldable electronic device 300 (e.g., the sensor module 176 of FIG. 1). For example, the foldable electronic device 300 may obtain an image using a camera, may recognize the actual object on the image using the sensor, and may obtain position information of the actual object. In another example, the foldable electronic device 300 may sense movement of the foldable electronic device 300 using the sensor and may display an arrow in a direction compensating for the movement. The user may move the foldable electronic device 300 in the direction of the arrow to superpose the edge shape 1550 of the object provided on the view angle area 1500 of the second preview on the actual object on the second preview. By superposing the edge shape 1550 on the actual object, the user may use the second preview having the same screen composition as the screen composition in the folded state 310*a*.

Figure 16:
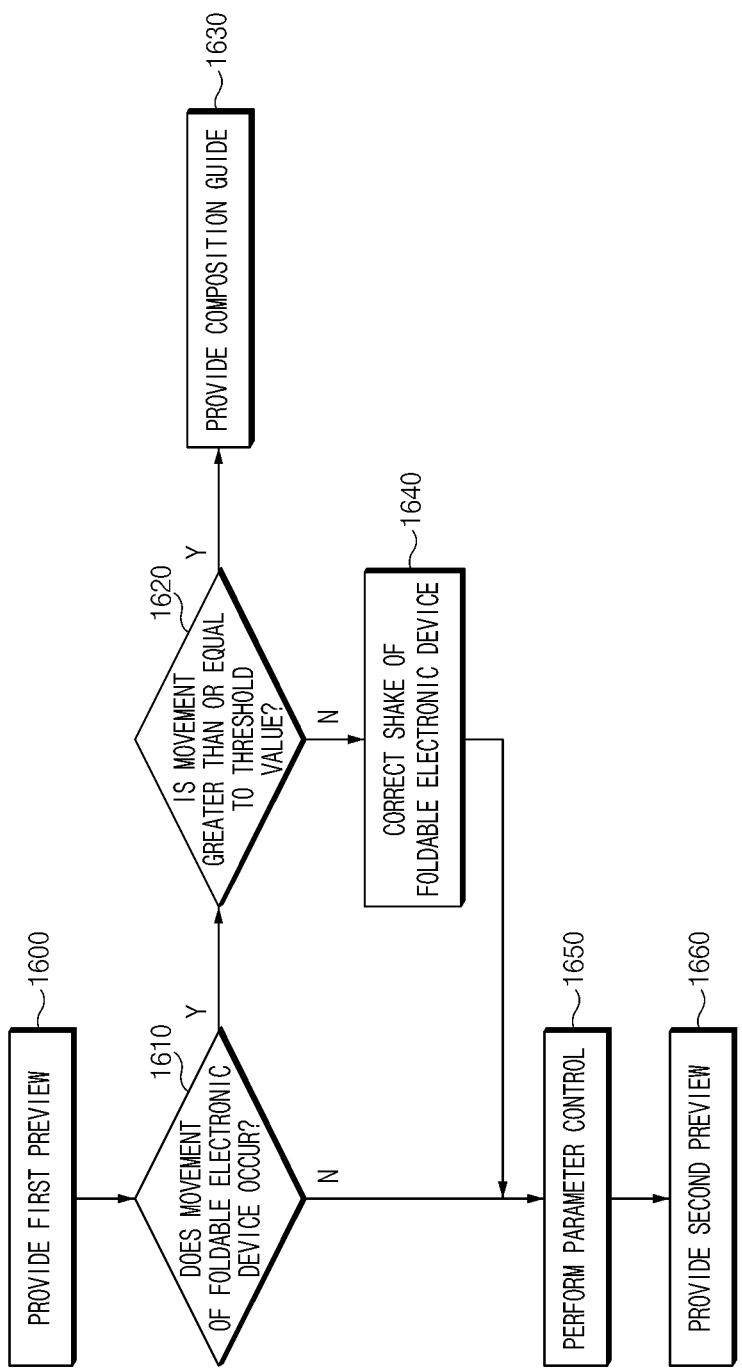
FIG. 16 is a flowchart illustrating a method of compensating a shake of a foldable electronic device due to folding/unfolding according to an embodiment.

FIG. 16 is a flowchart illustrating a method of compensating a shake of a foldable electronic device due to folding/unfolding according to an embodiment.

Description of FIG. 16 may be referred to in the context of the descriptions of FIGS. 3 to 15. The compensating for the shake of the foldable electronic device 300 may be performed by a processor (e.g., 610 of FIG. 6) of the foldable electronic device 300.

Referring to FIG. 16, in operation 1600, the processor 610 may provide a first preview on a first display 340 using a first camera.

In operation 1610, movement of the foldable electronic device 300 may occur due to the unfolding operation performed by the user. Due to the unfolding operation, the camera and the display of the foldable electronic device 300 may be switched. The processor 610 may proceed to operation 1650 when movement of the foldable electronic device 300 does not occur (1610-N). The processor 610 may proceed to operation 1620 when movement of the foldable electronic device 300 occurs (1610-Y).

In operation 1620, the processor 610 may determine whether the movement of the foldable electronic device 300 is greater than or equal to a threshold value. "Greater than or equal to the threshold value" may refer to the case in which the range of movement of the foldable electronic device 300 due to the unfolding exceeds a first maximum view angle area 1310. For example, when the view angle area 1500 of a second preview is completely outside the first maximum view angle area 1310 in the unfolded state 310*b*, the shake of the foldable electronic device 300 may be greater than or equal to the threshold value. "Less than the threshold value" may refer to the case in which the range of movement of the foldable electronic device 300 due to the unfolding is within the first maximum view angle area 1310.

When it is determined in operation 1620 that the movement is greater than or equal to the threshold value (1620-Y), the processor 610 may proceed to operation 1630. In operation 1630, the processor 610 may provide the edge shape 1550 of an object as a composition guide in a specific position on the view angle area 1500 of the second preview. The user may move the foldable electronic device 300 depending on the display of the screen composition guide to find screen composition in the folded state 310*a*.

When it is determined in operation 1620 that the movement is less than the threshold value (1620-N), the processor 610 may proceed to operation 1640. In operation 1640, the processor 610 may correct the shake of the foldable electronic device 300. The processor 610 may store, in memory (e.g., 620 of FIG. 6), information about the relative position and the size ratio of the view angle area 1300 of the first preview and the first object area 1320 in the folded state 310*a*. In the unfolded state 310*b*, the processor 610 may use the information to allow the relative position and the size ratio of the view angle area 1400 of the second preview and a second object area 1420 to remain the same as those in the folded state 310*a*. Based on the information, the processor 610 may move the view angle area 1400 of the second preview up, down, left, and right in a second maximum view angle area 1410 such that the view angle area 1400 of the second preview corresponds to the relative position and the size ratio of the view angle area 1300 of the first preview and the first object area 1320. As described above with reference to FIG. 14, the shake due to the unfolding may be corrected by moving the view angle area 1400 of the second preview.

In operation 1650, the processor 610 of the foldable electronic device 300 may perform parameter control to provide a second preview corresponding to an area setting input of the user in the folded state 310*a*. For example, to provide a second preview corresponding to a zoom-in input of the user for the first preview, the processor 610 may store, in the memory (620 of FIG. 6), coordinate information of a touch input of the user, level information of pinch zoom, and/or information about a relative position between an object and a touch input that is recognized using a sensor (e.g., the sensor module 176 of FIG. 1). The processor 610 may provide the second preview by reflecting the information in a parameter value and calculating a preview scale using the parameter value. Detailed description of the parameter control may be referred to by the description of FIG. 12. In FIG. 16, for convenience of description, operation 1650 is illustrated as being performed after operation 1640. However, according to an embodiment, operation 1650 may be performed in parallel in all of the operations in FIG. 16. Furthermore, when the area setting input of the user for the first preview is not present, operation 1650 may not be performed.

In operation 1660, the processor 610 may provide the second preview that corresponds to the area setting input of the user in the folded state 310a and in which the shake of the foldable electronic device 300 due to the unfolding is compensated.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. A foldable electronic device comprising:
    a foldable housing configured to be foldable along at least one axis;
    a first display disposed on a first surface of the foldable housing;
    a second display disposed on a second surface of the foldable housing;
    a first camera;
    a second camera;
    at least one sensor;
    memory; and
    a processor connected to the first display, the second display, the first camera, the second camera, the memory, and the at least one sensor,
    wherein the processor is configured to:
        provide, in a folded state, a first preview on the first display using the first camera;
        receive an area setting input for the first preview through the first display;
        detect unfolding of the foldable electronic device using the at least one sensor after receiving the area setting input; and
        provide, in an unfolded state, a second preview corresponding to the area setting input, through the second display using the second camera.

2. The foldable electronic device of claim 1, wherein the processor is further configured to:
    generate information about an angle of view of the first preview, based on the area setting input; and
    provide, in the unfolded state, the second preview corresponding to the information about the angle of view through the second display using the second camera.

3. The foldable electronic device of claim 2, wherein the area setting input includes a zoom-in input or a zoom-out input inputted by a user, and
    wherein the processor is further configured to provide, in the unfolded state, a zoomed-in or zoomed-out second preview based on one point of the zoom-in input or the zoom-out input, through the second display using the second camera.

4. The foldable electronic device of claim 3, wherein the processor is further configured to:
    provide the zoomed-in second preview through the second display when the area setting input is the zoom-in input; and
    provide the second preview that is not zoomed-in through a sub-frame of the second display, and
    wherein the sub-frame is a partial area of the second display.

5. The foldable electronic device of claim 4, wherein the processor is further configured to remove the sub-frame in response to receiving an input of the user to an area of the second display other than the sub-frame.

6. The foldable electronic device of claim 1, wherein the area setting input includes an input by which a user specifies a first object area in a view angle area of the first preview,
    wherein the processor is further configured to:
        store, in the folded state, information related to a position and a ratio of the first object area relative to the view angle area of the first preview; and
        correct, in the unfolded state, a position and a ratio of a second object area relative to a view angle area of the second preview such that the position and the ratio of the second object area relative to the view angle area of the second preview correspond to the position and the ratio of the first object area relative to the view angle area of the first preview, and
    wherein the second object area corresponds to the first object area.

7. The foldable electronic device of claim 6, wherein a displaying area of the first preview is a partial area of a first maximum view angle area capable of being captured using the first camera, and
    wherein a displaying area of the second preview is a partial area of a second maximum view angle area capable of being captured using the second camera.

8. The foldable electronic device of claim 1, wherein the processor is further configured to:
    apply, in the folded state, an image effect to the first preview and provide the first preview in which the image effect is applied through the first display; and
    apply, in the unfolded state, the image effect to the second preview and provide the second preview in which the image effect is applied through the second display.

9. The foldable electronic device of claim 8, wherein the processor is further configured to:
    apply, in the folded state, the image effect to the first preview based on properties of the first camera and the first display; and apply, in the unfolded state, the image effect to the second preview based on properties of the second camera and the second display.

10. A method for operating a foldable electronic device, the method comprising:
providing, in a folded state, a first preview on a first display using a first camera;
receiving an area setting input for the first preview through the first display;
detecting unfolding of the foldable electronic device using at least one sensor after receiving the area setting input; and
providing, in an unfolded state, a second preview corresponding to the area setting input, through a second display using a second camera.

11. The method of claim 10, further comprising:
generating information about an angle of view of the first preview, based on the area setting input; and
providing, in the unfolded state, the second preview corresponding to the information about the angle of view through the second display using the second camera.

12. The method of claim 11, wherein the area setting input includes a zoom-in input or a zoom-out input inputted by a user, and
wherein the method further comprises providing, in a unfolded state, the zoomed-in or zoomed-out second preview based on one point of the zoom-in input or the zoom-out input, through the second display using the second camera.

13. The method of claim 12, further comprising:
providing the zoomed-in second preview through the second display when the area setting input is the zoom-in input; and
providing the second preview that is not zoomed-in through a sub-frame of the second display,
wherein the sub-frame is a partial area of the second display.

14. The method of claim 13, further comprising:
removing the sub-frame in response to receiving an input of the user to an area of the second display other than the sub-frame.

15. The method of claim 10, wherein the area setting input includes an input by which a user specifies a first object area in a view angle area of the first preview,
wherein the method further comprises:
storing, in the folded state, information related to a position and a ratio of the first object area relative to the view angle area of the first preview; and
correcting, in the unfolded state, a position and a ratio of a second object area relative to a view angle area of the second preview such that the position and the ratio of the second object area relative to the view angle area of the second preview correspond to the position and the ratio of the first object area relative to the view angle area of the first preview, and
wherein the second object area corresponds to the first object area.

16. The method of claim 15, wherein a displaying area of the first preview is a partial area of a first maximum view angle area capable of being captured using the first camera, and
wherein a displaying area of the second preview is a partial area of a second maximum view angle area capable of being captured using the second camera.

17. The method of claim 15, further comprising:
applying, in the folded state, an image effect to the first preview and providing the first preview in which the image effect is applied through the first display; and
applying, in the unfolded state, the image effect to the second preview and providing the second preview in which the image effect is applied through the second display.

18. The method of claim 17, further comprising:
applying, in the folded state, the image effect to the first preview based on properties of the first camera and the first display; and
applying, in the unfolded state, the image effect to the second preview based on properties of the second camera and the second display.

19. A non-transitory computer-readable recording medium that stores one or more instructions executable by at least one processor, wherein the one or more instructions, when executed, cause the at least one processor to:
provide, in a folded state, a first preview on a first display using a first camera;
receive an area setting input for the first preview through the first display;
detect unfolding of a foldable electronic device using at least one sensor after receiving the area setting input; and
provide, in an unfolded state, a second preview corresponding to the area setting input, through a second display using a second camera.

20. The non-transitory computer-readable recording medium of claim 19, wherein the one or more instructions, when executed, cause the at least one processor to:
generate information about an angle of view of the first preview, based on the area setting input; and
provide, in the unfolded state, the second preview corresponding to the information about the angle of view through the second display using the second camera.

* * * * *